US008438488B2

(12) United States Patent
Kawai

(10) Patent No.: US 8,438,488 B2
(45) Date of Patent: May 7, 2013

(54) IMAGE-FORMING APPARATUS WITH CUSTOMIZABLE OPERATION PANEL SETTINGS, METHOD THEREOF, AND RECORDING MEDIUM

(75) Inventor: Takanao Kawai, Osaka (JP)

(73) Assignee: Kyocera Document Solutions, Inc., Osaka (JP)

( * ) Notice: Subject to any disclaimer, the term of this patent is extended or adjusted under 35 U.S.C. 154(b) by 1444 days.

(21) Appl. No.: 11/985,137

(22) Filed: Nov. 14, 2007

(65) Prior Publication Data

US 2008/0267654 A1 Oct. 30, 2008

(30) Foreign Application Priority Data

Nov. 15, 2006 (JP) ................................ 2006-308981

(51) Int. Cl.
*G06F 3/01* (2006.01)

(52) U.S. Cl.
USPC ............ 715/745; 715/744; 715/733; 715/700

(58) Field of Classification Search .................. 715/745, 715/744, 733, 700; 399/81, 83
See application file for complete search history.

(56) References Cited

U.S. PATENT DOCUMENTS

| | | | | |
|---|---|---|---|---|
| 7,130,069 | B1 * | 10/2006 | Honma | 358/1.15 |
| 2004/0205099 | A1 * | 10/2004 | Hagiwara | 709/200 |
| 2005/0039126 | A1 * | 2/2005 | Katano | 715/700 |
| 2005/0152544 | A1 * | 7/2005 | Kizawa | 380/55 |
| 2005/0270586 | A1 * | 12/2005 | Hashimoto | 358/400 |
| 2006/0274358 | A1 * | 12/2006 | Fukui et al. | 358/1.15 |
| 2007/0279678 | A1 * | 12/2007 | Kobayashi | 358/1.15 |
| 2008/0127159 | A1 * | 5/2008 | Regenmorter | 717/168 |

FOREIGN PATENT DOCUMENTS

| | | | |
|---|---|---|---|
| JP | 2000-76234 | A | 3/2000 |
| JP | 2001-24824 | A | 1/2001 |
| JP | 2001-306204 | A | 11/2001 |
| JP | 2004-153639 | | 5/2004 |
| JP | 2004-280212 | | 10/2004 |
| JP | 2006-133520 | | 5/2006 |

OTHER PUBLICATIONS

Notice of Reasons for Rejection issued to JP Application No. 2006-308981, mailed May 17, 2011, 2008.

* cited by examiner

*Primary Examiner* — Tadeese Hailu
*Assistant Examiner* — Darrin Hope
(74) *Attorney, Agent, or Firm* — Dilworth & Barrese, LLP.

(57) ABSTRACT

An Image-forming apparatus, which that can customize operation panel screens and customizes panel screen design information, having a communications unit that receives panel customizing information including sending origin identification information, user information, and panel customizing data from a server, user terminal or a plurality of Image-forming apparatuses. The panel customizing information control unit controls according to the type of sending origin determined by the sending origin determining unit and stores the received panel customizing information in the panel customizing information memory unit. The operation panel screen control unit controls the configurations of the operation panel screens and operating keys based on the stored panel customizing information, and standard screen design information.

8 Claims, 20 Drawing Sheets operations of the operation panel operation starting processing

IMAGE-FORMING APPARATUS WITH CUSTOMIZABLE OPERATION PANEL SETTINGS, METHOD THEREOF, AND RECORDING MEDIUM

This application is based on and claims the benefit of priority from Japanese Patent Application No. 2006-308981, filed on 15 Nov. 2006, the content of which is incorporated herein by reference.

BACKGROUND OF THE INVENTION

1. Field of the Invention

The present invention relates to Image-forming apparatuses with customizable operation panel settings, a method thereof, and recording medium.

2. Related Art

Conventionally, there are Image-forming apparatuses that allow customizing of standard-installation operation panels on Image-forming apparatuses (systems equipped with at least one of the functions of copying, printing, scanning and facsimile transmission; this also applies to the following description). With these kinds of Image-forming apparatuses, for an Image-forming apparatus that requires customizing, an operator inputs information into a customizing setting screen and registers that on an Image-forming apparatus to customize a screen.

However, if a plurality of Image-forming apparatuses exists on the same network, the operator must make the same settings for each of the apparatuses, which entails a lot of work. Particularly, resolving this issue is indispensable in large-scale offices where there are a high number of Image-forming apparatuses. Thus, it is conceivable that customizing settings performed on one Image-forming apparatus can be reflected on-another Image-forming apparatus over a network.

However, in a large-scale office, the frequency of functions used may differ according to section, for example. In such cases, simply because settings were customized on one Image-forming apparatus does not indicate that the same settings should be made for all Image-forming apparatuses. Conversely, making the same customizing settings on all apparatuses could cause problems. In addition, if the types of models are different, it may not be possible to simply reflect the customized settings uniformly for all apparatuses. Furthermore, in a network configuration, there may not necessarily be a server available for customizing settings.

Therefore, if there is a plurality of Image-forming apparatuses connected to a network, it is necessary to consider the section, apparatus model, and the configuration of a network in order to reflect customizing settings on one Image-forming apparatus onto another Image-forming apparatus.

An object of the present invention is to provide an Image-forming apparatus that can perform settings of all Image-forming apparatus connected to a network relating to customizing settings simply by customizing settings at one location for a screen routinely equipped on an Image-forming apparatus.

SUMMARY OF THE INVENTION

The present invention provides the following resolving means.

In a first aspect of the present invention, an Image-forming apparatus that can customize operation panel screens is provided with the following configuration. The Image-forming apparatus is equipped with a communication unit that communicates with a server connected to a network, a user terminal, and a plurality of other Image-forming apparatuses, a panel screen design information memory unit that stores design information of a standard screen of the operation panel screens; a panel customizing information memory unit that stores panel customizing information including sending origin identification information, user information and panel customizing data; a sending origin determining unit that determines the sending origin using the sending origin identification information of the panel customizing information received via the communication unit; a panel customizing information control unit that controls according to the type of sending origin determined by the sending origin determining unit, and stores the panel customizing information received via the communication unit in the panel customizing information memory unit; panel customizing information stored by the panel customizing information memory unit; and operation panel screen control unit that controls the configurations of the operation panel screen and keys based on design information of the standard screens.

According to the Image-forming apparatus of the first aspect of the present invention, the Image-forming apparatus can customize operation panel screens; and the communication unit communicates data with a server, user terminal and a plurality of Image-forming apparatuses connected to a network. The panel screen design information memory unit stores standard screen design information of the operation panel screen. In addition, the panel customizing information control unit controls to store panel customizing information in the panel customizing information memory unit according to the type of sending origin determined by the sending origin determining unit using the sending origin identifying information of panel customizing information including sending origin identifying information, user information and panel customizing data. The operation panel screen control unit controls the configurations of the operation panel screens and operating keys based on the panel customizing information stored by the panel customizing information memory unit, and standard screen design information.

Thus, as described above, the Image-forming apparatus can receive the panel customizing information from a server, user terminal or other Image-forming apparatuses connected to a network, and can control the configurations of the operation panel screen and operating keys based on the received panel customizing information and standard screen design information. Therefore, if one of the server, user terminal and another Image-forming apparatus updates the settings of the panel customizing information, it is possible to update the configurations of the operation panel screens and keys at all other Image-forming apparatuses by receiving that information.

DETAILED DESCRIPTION OF THE INVENTION

Figure 1:
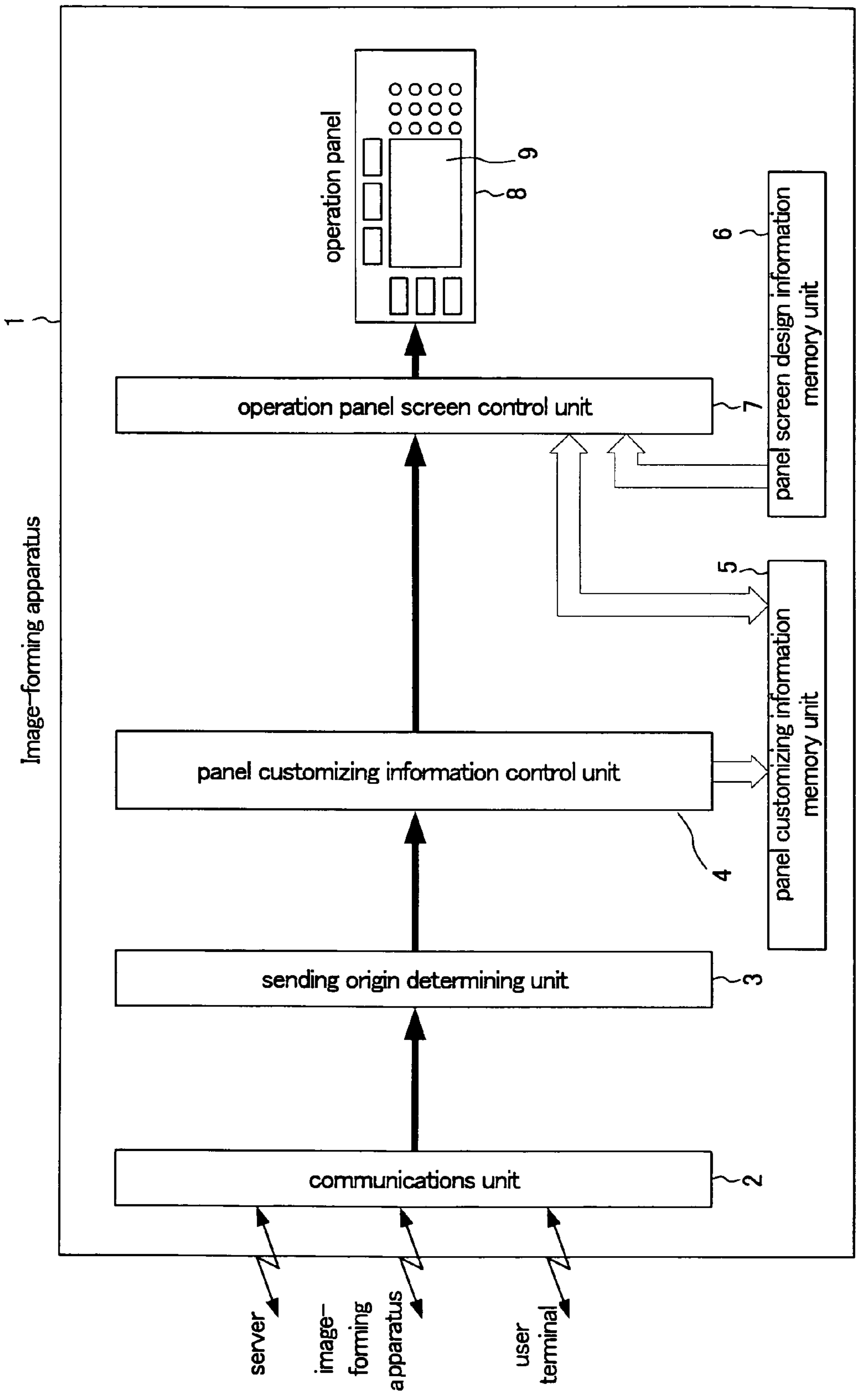
FIG. 1 is a diagram showing a configuration block of an Image-forming apparatus of a first embodiment of the present invention.

The following explains embodiments of the present invention.

First Embodiment

One embodiment of the Image-forming apparatus 1 of the present invention is explained with reference to FIGS. 1 to 17. It is possible for this Image-forming apparatus 1 (FIG. 1) to customize the operation panel screen 9. A communications unit 2, a sending origin determining unit 3, a panel customizing information control unit 4, a panel customizing information memory unit 5, a panel screen design information memory unit 6, an operation panel screen control unit 7, an operation panel 8, and an operation panel screen 9 are provided as a configuration of the embodiment. In addition, a server 50 (see FIG. 12) connected to a network, a user terminal 60 (see FIG. 14), and a plurality of other Image-forming apparatuses 1 perform data communication; panel customizing information 100 is stored in the panel customizing information memory unit 5. The operation panel screen control unit 7 controls the configurations of the operation panel 8 screens and operating keys based on the panel customizing information 100 and standard screen design information. The Image-forming apparatus 1 is equipped with a panel customizing information temporary memory unit (RAM) that temporarily stores panel customizing information 100 received via the communications unit 2, based on signals from the operation panel 8; a group name data reception unit (see FIG. 10) that receives input of group names data; a group name data memory unit (RAM) that stores inputted group names data, and a setting update message memory unit (RAM) that stores setting update starting messages to start updating settings of the panel customizing information 100, or setting update ending messages to end updating settings of the panel customizing information 100, received via the communications unit 2. The following explains these in detail based on the drawings provided.

FIG. 1 is a block diagram showing a configuration block of the Image-forming apparatus 1 according to the present invention.

The Image-forming apparatus 1 according to the present invention is capable of at least one of the functions of copying, scanning, sending facsimiles or printing, and it can be a multi-function device. The apparatus is provided with a computer operating environment having memory units (RAM, ROM, and hard disk and the like) and a CPU. A communications unit 2, a sending origin determining unit 3, a panel customizing information control unit 4, a panel customizing information memory unit 5, a panel screen design information memory unit 6, an operation panel screen control unit 7, an operation panel 8, and an operation panel screen 9 are provided as a configuration of the present invention.

The communications unit 2 sends and receives data with the server 50, user terminal 60 or the plurality of Image-forming apparatuses 1.

Figure 2:
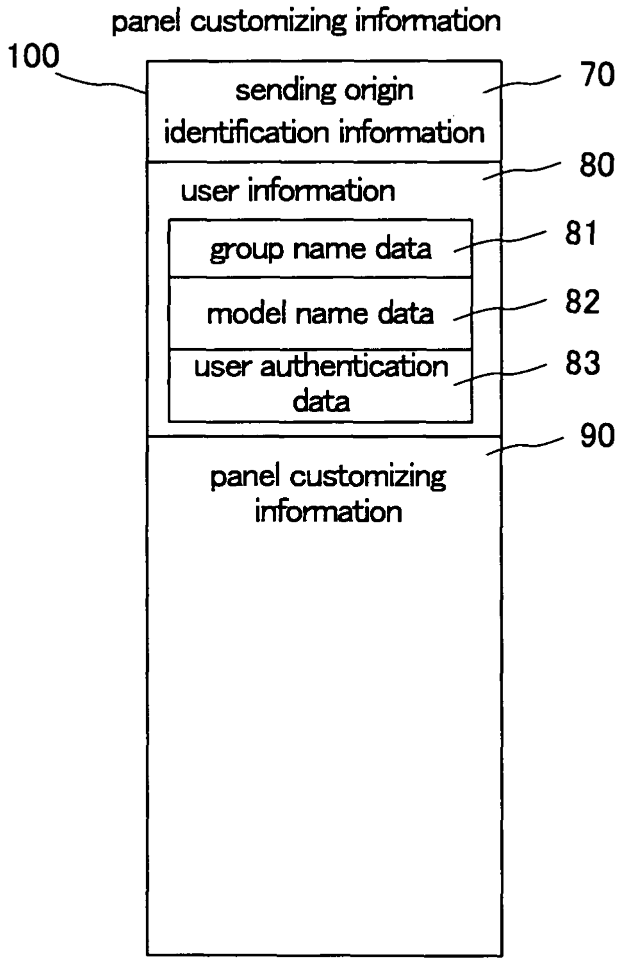
FIG. 2 is a data configuration diagram of panel customizing information of the present invention.

The sending origin determining unit 3 determines the sending origin based on sending origin identification information 70 (see FIG. 2). Data that identifies whether the sending origin is the server 50, the user terminal 60, or the Image-forming apparatus 1 is included in the sending origin identification information 70. In addition, the sending origin determining unit 3 determines the group name data 81 (see FIG. 2), and the model name data 82 (see FIG. 2) included in the user information 80 (see FIG. 2) and determines by comparing the group names and model names possessed by the Image-forming apparatus 1 has.

The panel customizing information control unit 4 controls according to the type of sending origin determined by the sending origin determining unit 3 and stores the received panel customizing information 100 in the panel customizing information memory unit 5. When the operation panel 8 is in use by a user, the received panel customizing information 100 is temporarily stored in a storage unit that is different from the panel customizing information memory unit 5, which stores the panel customizing information 100 corresponding to the configuration of the operation panel screen 9 that is in use. Moreover, when there is a user authentication data memory unit 11 and personal panel customizing information memory unit 10, the panel customizing information 100 received from the user terminal 60 is stored in the personal panel customizing information memory unit 10 based on the user authentication data. (The second embodiment; described in detail below.) The panel customizing information memory unit 5 stores the panel customizing information 100 in RAM or the like. The panel customizing information 100 is information that sets the configuration of the operation panel screen 9 and operations, and is created by updating settings from the operation panel 8. In addition, that is stored by being received via the communications unit 2. For example, the panel customizing information 100 for the copying function has paper settings and a switch of languages to be displayed on the operating screen as copier initial settings.

The panel screen design information memory unit 6 stores standard screen design information of the operation panel screen 9 in ROM or the like. For example, standard screen design information contains standard setting values such as A4 for a paper setting and Japanese language for the language setting for the copier functions. In addition, it contains standard setting values such as the position and size of graphics displayed on the operation panel screen 9. Moreover, it can contain information such as the operating order of menus of the operation panel screen 9.

The operation panel screen control unit 7 controls the configurations of the operation panel screen 9 and operating keys based on the panel customizing information 100 stored in the panel customizing information memory unit 5 and the design information of the standard screen stored by the panel screen design information memory unit 6. Furthermore, when the user authentication data memory unit 11 is provided, this controls the configurations of the operation panel screen 9 and the operating keys based on the personal panel customizing information memory unit 10 that pairs with the specified user authentication data memory unit 11 and the design information of the standard screen. (second embodiment; see FIG. 18)

The operation panel 8 is for operation of the Image-forming apparatus 1. This panel is equipped with a display screen and keys such as a start key, a stop/clear key, a reset key, a copy key, a printer key, a scanner key and a fax key.

The operation panel screen 9 is the display screen disposed on the operation panel 8. This displays screens that guide user operations and various messages. This displays messages that settings of the panel customizing information 100 cannot be updated, screens for inputting group names using a group name reception process (see the flowchart in FIG. 10), and a user name input screen (see the flowchart in FIG. 19) using a switching process of the current user authentication data.

FIG. 2 shows a configuration of the panel customizing information 100. That drawing shows that the panel customizing information 100 is composed of the sending origin identification information 70, the user information 80 and the panel customizing data 90; the user information 80 is composed of the group name data 81, the model name data 82, and the user authentication data 83. The sending origin identification information 70 includes data of whether the sending origin is the server 50, the user terminal 60, or the Image-forming apparatus 1. The group name data 81 is data of the section to which the Image-forming apparatus 1 belongs, for example. It is possible to classify the Image-forming apparatus 1 into groups using this information. The model identification data is data of the type and the model of the Image-forming apparatus 1. This data can be used to separate panel customizing information 100 that differs depending on the type and the model or the like. The user authentication data 83 of the panel customizing information 100 is data for authenticating the user terminal 60. This is used to make personal settings for the Image-forming apparatus 1. The panel customizing data 90 is data relating to the configurations of the operation panel screen 9 and operating keys. The operation panel screen 9 can be reconfigured based on the standard screen design information and this data.

Flowcharts

Figure 3:
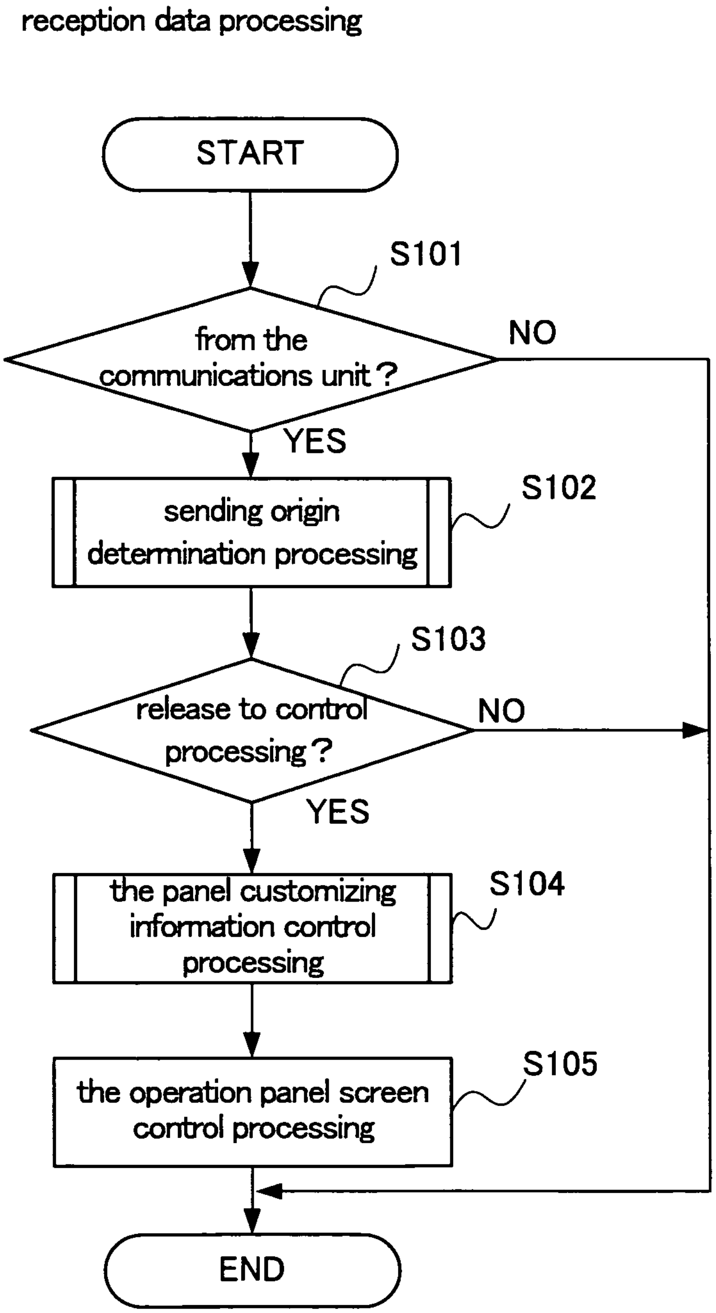
FIG. 3 is a diagram showing a reception data processing flowchart of the present invention.

The following explains the operations of this embodiment with reference to the flowchart shown in FIG. 3. This program is started after initial settings are completed in the main processing and data is received from the network.

In step S101, the Image-forming apparatus 1 CPU determines whether data has been received from the communications unit 2. If there is reception data, the processing shifts to step S102. If there is no reception data, the processing ends.

When the processing shifts to step S102, the Image-forming apparatus 1 CPU performs the sending origin determination processing. Specifically, the processing shifts to the sending origin determination processing (see FIG. 4, described below). Then, the processing shifts to step S103.

When the processing shifts to step S103, the Image-forming apparatus 1 CPU determines whether to release that to the panel customizing information control processing as the result of the sending origin determination processing. If that is not to be released to the panel customizing information control processing, the processing ends. If it is released to the panel customizing information control processing, the processing shifts to step S104.

When the processing shifts to step S104, the Image-forming apparatus 1 CPU performs the panel customizing information control processing. Specifically, the processing shifts to the panel customizing information control processing (see FIG. 5, described below). Then, the processing shifts to step S105.

When the processing shifts to step S105, the Image-forming apparatus 1 CPU performs the operation panel screen control processing. Specifically, this controls the configurations of the operation panel 8 and operating keys based on the panel customizing information 100 stored in the panel customizing information memory unit 5 (or the personal panel customizing information memory unit 10), and the design information of the standard screen. Then, the processing ends.

Figure 4:
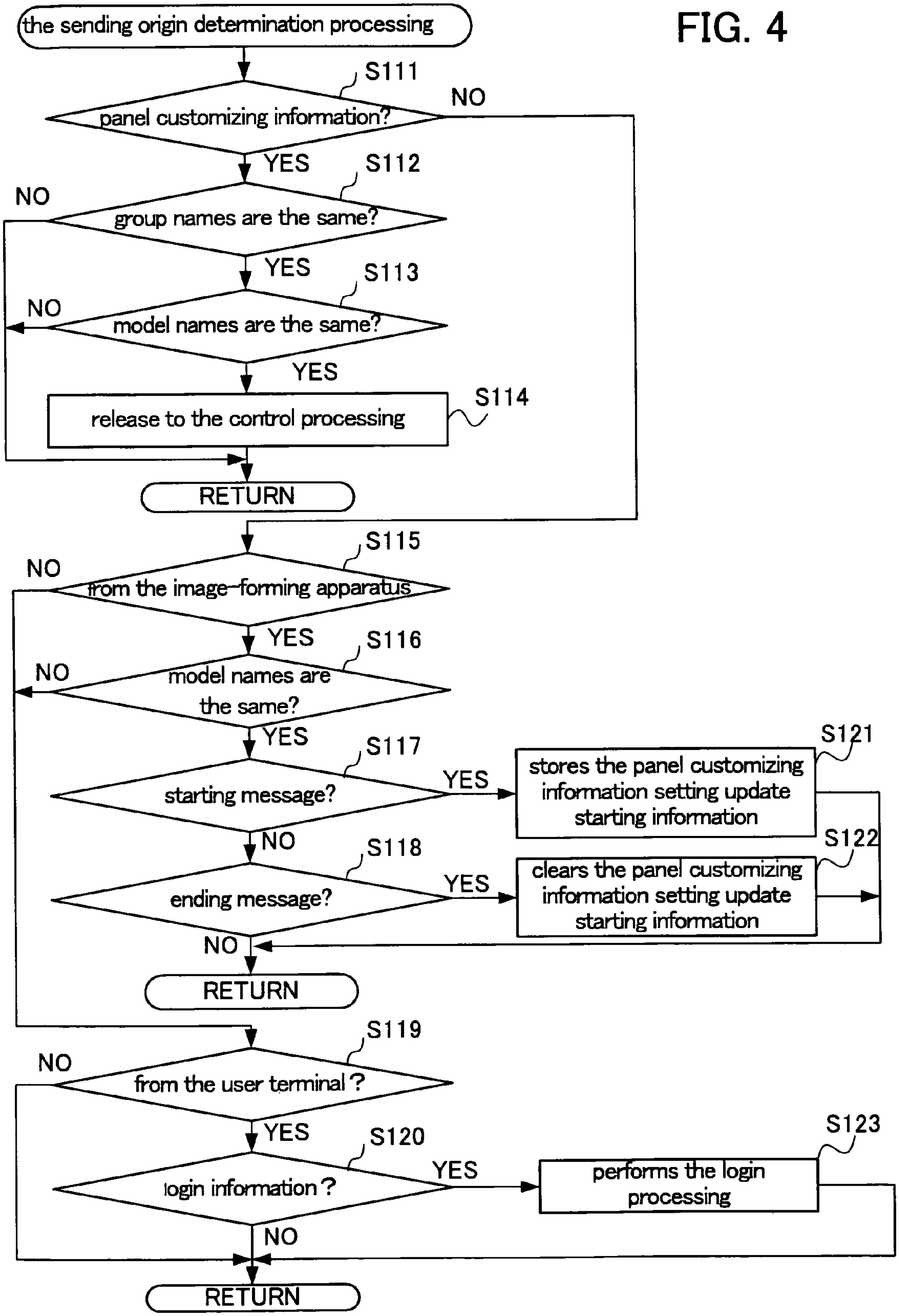
FIG. 4 is a diagram showing a sending origin determination process flowchart of the present invention.

The following explains the operations of the sending origin determination processing with reference to the flowchart shown in FIG. 4.

In step S111, the Image-forming apparatus 1 CPU determines whether data received from the communications unit 2 is panel customizing information 100. If the data is not panel customizing information 100, the processing shifts to step S115. If the data is panel customizing information 100, the processing shifts to step S112.

When the processing shifts to step S112, the Image-forming apparatus 1 CPU determines whether the group names are the same. Specifically, the processing compares the group name data 81 of the panel customizing information 100 with the group name stored as data. If they-are different, the processing returns to the receive data processing (FIG. 3). If they are the same, the processing shifts to step S113.

When the processing shifts to step S113, the Image-forming apparatus 1 CPU determines whether the model names are the same. Specifically, the processing compares the model name data 82 of the panel customizing information 100 with the model name stored as data. If they are different, the processing returns to the receive data processing (FIG. 3). If they are the same, the processing shifts to step S114.

When the processing shifts to step S114, the Image-forming apparatus 1 CPU performs processing to release data to the panel customizing information control processing. Specifically, the release flag is turned ON to release to the panel customizing information control processing. Thereafter, the processing returns to the receive data processing (FIG. 3).

When the processing shifts to step S115, the Image-forming apparatus 1 CPU determines whether there is data from the Image-forming apparatus 1. Specifically, it is determined whether the sending origin identification information 70 of the panel customizing information 100 is data from the Image-forming apparatus 1. If it is not data from the Image-forming apparatus 1, the processing shifts to step S119. If it is data from the Image-forming apparatus 1, the processing shifts to step S116.

When the processing shifts to step S116, the Image-forming apparatus 1 CPU determines whether the model names are the same. Specifically, the processing compares the model name data 82 of the panel customizing information 100 with the model name stored as data. If they are different, the processing shifts to step S119. If they are the same, the processing shifts to step S117.

When the processing shifts to step S117, the Image-forming apparatus 1 CPU determines whether it is a panel customizing setting update starting message. If it is the panel customizing setting update starting message, the processing shifts to step S121. If it is not the panel customizing setting update starting message, the processing shifts to step S118.

When the processing shifts to step S118, the Image-forming apparatus 1 CPU determines whether it is a panel customizing setting update ending message. If it is the panel customizing setting update ending message, the processing shifts to step S122. If it is not the panel customizing setting update ending message, the processing is returned to the receive data processing (FIG. 3).

When the processing shifts to step S119, the Image-forming apparatus 1 CPU determines whether there is data from the user terminal 60. If it is not data from the user terminal 60, the processing is returned to the receive data processing (FIG. 3). If it is data from the user terminal 60, the processing shifts to step S120.

When the processing shifts to step S120, the Image-forming apparatus 1 CPU determines whether it is login information. If it is login information, the processing shifts to step S123. If it is not login information, the processing returns to the receive data processing (FIG. 3).

When the processing shifts to step S121, the Image-forming apparatus 1 CPU stores the panel customizing information setting update starting information. Specifically, a panel customizing information setting update starting flag that indicates that the update of settings of the panel customizing information 100 has started at the Image-forming apparatus 1 is turned ON. Thereafter, the processing returns to the receive data processing (FIG. 3).

When the processing shifts to step S122, the Image-forming apparatus 1 CPU clears the panel customizing information setting update starting information. Specifically, the panel customizing information setting update starting flag is turned OFF. Thereafter, the processing returns to the receive data processing (FIG. 3).

When the processing shifts to step S123, the Image-forming apparatus 1 CPU performs the login processing. Specifically, it stores the user terminal 60 address information and the user authentication data. Thereafter, the processing returns to the receive data process (FIG. 3).

Figure 5:
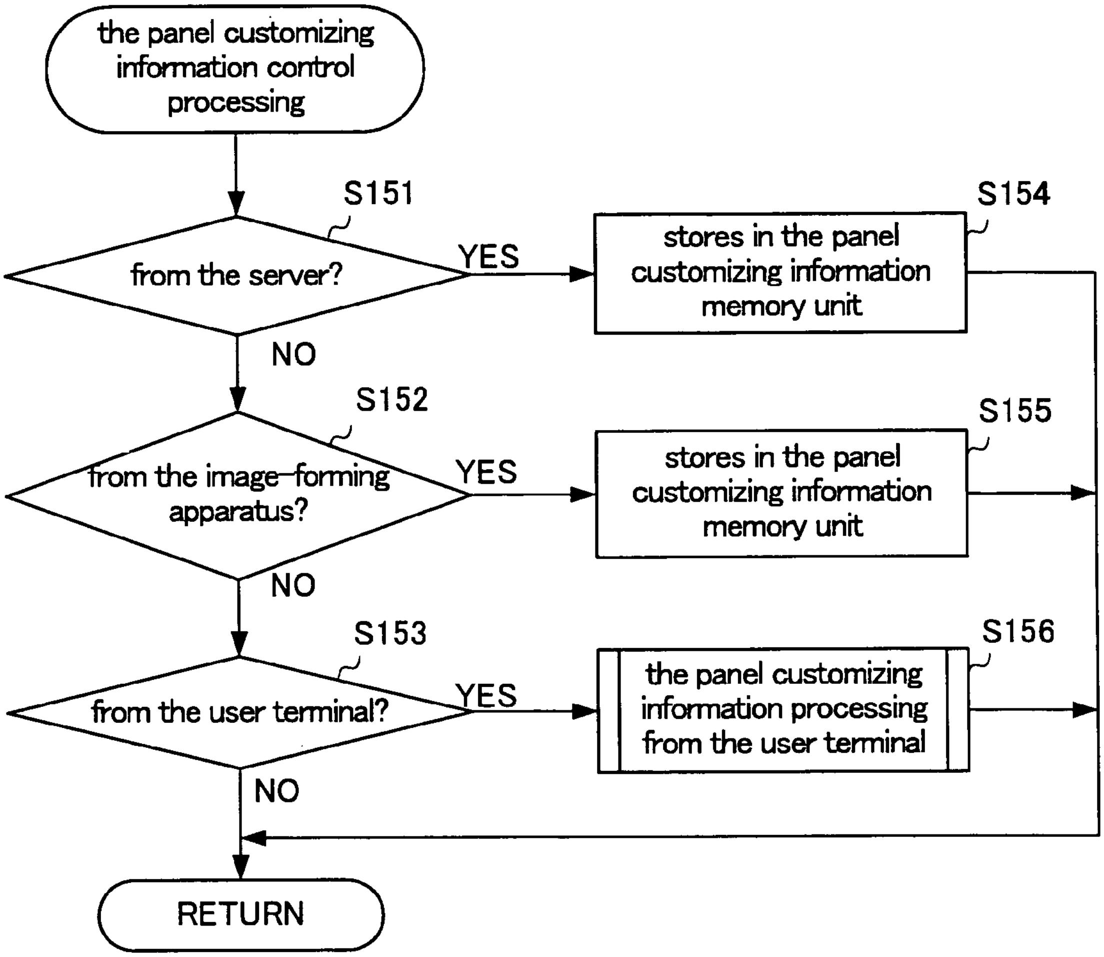
FIG. 5 is a diagram showing a panel customizing information control process flowchart of the present invention.

The following explains the operations of the panel customizing information control processing with reference to the flowchart shown in FIG. 5.

In step S151, the Image-forming apparatus 1 CPU determines whether the panel customizing information 100 is. from the server 50. If it is the panel customizing information 100 from the server 50, the processing shifts to step S154. If it is not the panel customizing information 100, the processing shifts to step S152.

When the processing shifts to step S152, the Image-forming apparatus 1 CPU determines whether the panel customizing information 100 is from the Image-forming apparatus 1. If it is the panel customizing information 100 from the Image-forming apparatus 1, the processing shifts to step S155. If it is not the panel customizing information 100, the processing shifts to step S153.

When the processing shifts to step S153, the Image-forming apparatus 1 CPU determines whether the panel customizing information 100 is from the user terminal 60. If it is the panel customizing information 100 from the user terminal 60, the processing shifts to step S156. If it is not the panel customizing information 100, the processing is returned to the receive data processing (FIG. 3).

Figure 7:
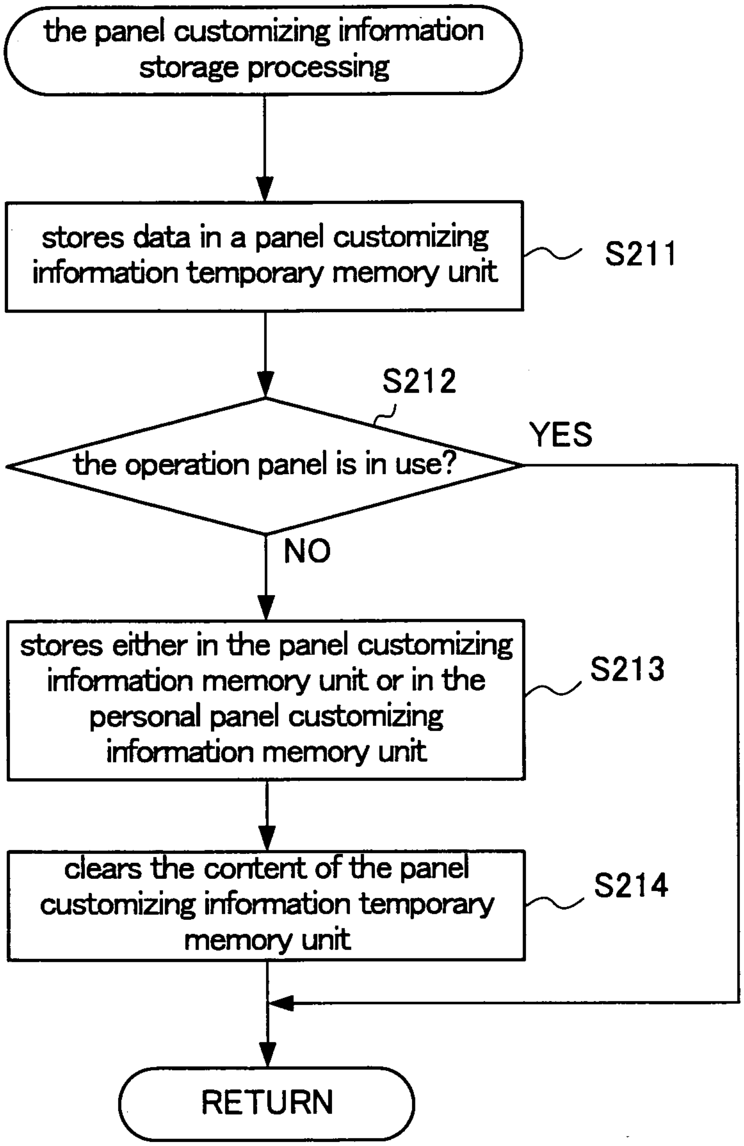
FIG. 7 is a diagram showing a panel customizing information storage process flowchart of the present invention.

When the processing shifts to step S154, the Image-forming apparatus 1 CPU stores the panel customizing information 100 from the server 50 in the panel customizing information memory unit 5 using the panel customizing information storage processing (see FIG. 7). Thereafter, the processing returns to the receive data processing (FIG. 3).

When the processing shifts to step S155, the Image-forming apparatus 1 CPU stores the panel customizing information 100 from the Image-forming apparatus 1 in the panel customizing information memory unit 5 using the panel customizing information storage processing (see FIG. 7). Thereafter, the processing returns to the receive data processing (FIG. 3).

When the processing shifts to step S156, the Image-forming apparatus 1 CPU shifts the processing to the panel customizing information processing from the user terminal 60. (See FIG. 6). Thereafter, the processing returns to the receive data process (FIG. 3).

Figure 6:
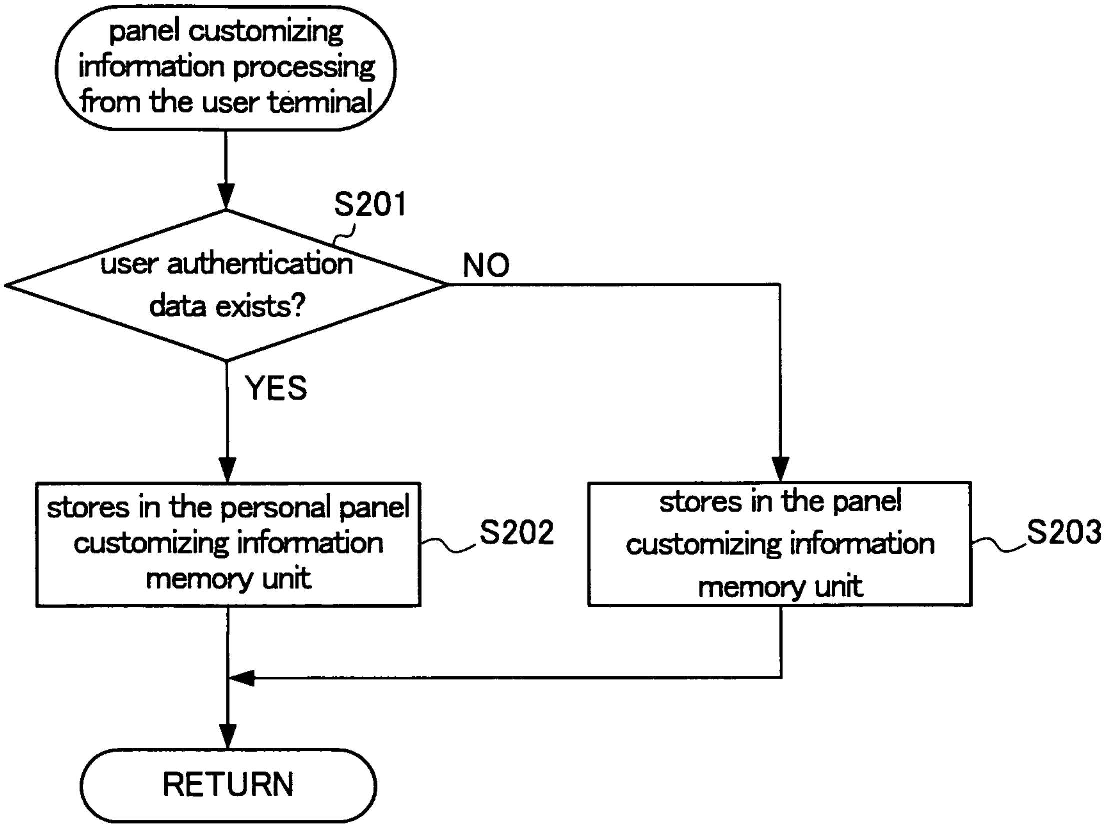
FIG. 6 is a diagram showing a panel customizing information process flowchart from a user terminal of the present invention.

The following explains the operations of the panel customizing information processing from the user terminal 60 with reference to the flowchart shown in FIG. 6.

In step S201, the Image-forming apparatus 1 CPU determines whether user authentication data that is the same as the user authentication data 83 of the panel customizing information 100 exists in the user authentication data memory unit 11. If the same user authentication data does not exist, the processing shifts to step S203. If the same user authentication data exists, the processing shifts to step S202.

When the processing shifts to step S202, the Image-forming apparatus 1 CPU stores the panel customizing information 100 in the personal panel customizing information memory unit 10 using the panel customizing information storage processing (see FIG. 7) Thereafter, the processing returns to the panel customizing information control processing (FIG. 5).

When the processing shifts to step S203, the Image-forming apparatus 1 CPU stores the panel customizing information 100 in the panel customizing information memory unit 5 using the panel customizing information storage processing (see FIG. 7). Thereafter, the processing returns to the panel customizing information control processing (FIG. 5).

The following explains the operations of the panel customizing information storage processing with reference to the flowchart shown in FIG. 7.

In step S211, the Image-forming apparatus 1 CPU stores data in a panel customizing information temporary memory unit. Then, the processing shifts to step S212.

When the processing shifts to step S212, the Image-forming apparatus 1 CPU determines whether the operation panel 8 is in use. If the operation panel 8 is in use, the processing is returned to panel customizing information processing from the user terminal (FIG. 6). If the operation panel 8 is not in use, the processing shifts to step S213.

When the processing shifts to step S213, the Image-forming apparatus 1 CPU-stores that information either in the panel customizing information memory unit 5 or in the personal panel customizing information memory unit 10 according to the method of using data stored by the panel customizing information temporary storage unit. Then, the processing shifts to step S214.

When the processing shifts to step S214, the Image-forming apparatus 1 CPU clears the content of the panel customizing information temporary memory unit. Thereafter, the processing returns to panel customizing information processing from the user terminal (FIG. 6).

Figure 8:
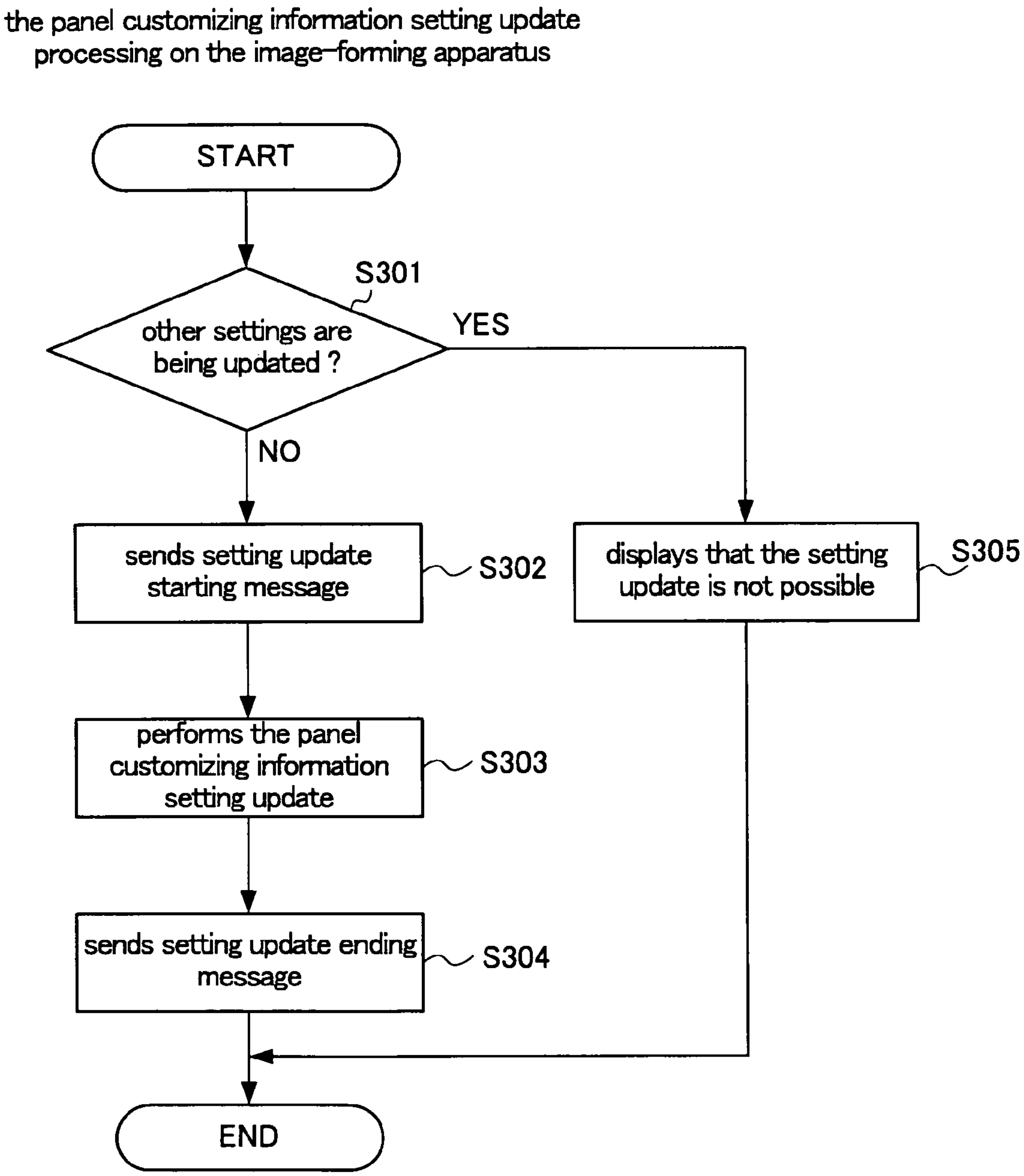
FIG. 8 is a diagram showing a panel customizing information setting update process flowchart on an Image-forming apparatus of the present invention.

The following explains the operations of the panel customizing information setting update processing on the Image-forming apparatus 1 with reference to the flowchart shown in FIG. 8. This program is started when the panel customizing information 100 settings are updated.

In step S301, the Image-forming apparatus 1 CPU determines whether other Image-forming apparatus settings are being updated. If other Image-forming apparatus' 1 settings are being updated, the processing shifts to step S305. If the settings of another Image-forming apparatus 1 are not being updated, the processing shifts to step S302.

When the processing shifts to step S302, the Image-forming apparatus 1 CPU sends a panel customizing information setting update starting message. Then, the processing shifts to step S303.

When the processing shifts to step S303, the Image-forming apparatus 1 CPU performs the panel customizing information setting update. Then, the processing shifts to step S304.

When the processing shifts to step S304, the Image-forming apparatus 1 CPU sends a panel customizing information setting update ending message. Then, the processing ends.

When the processing shifts to step S305, the Image-forming apparatus 1 CPU displays a message in the operation panel screen 9 that the setting update processing of the panel customizing information 100 is not possible. Then, the processing ends.

Figure 9:
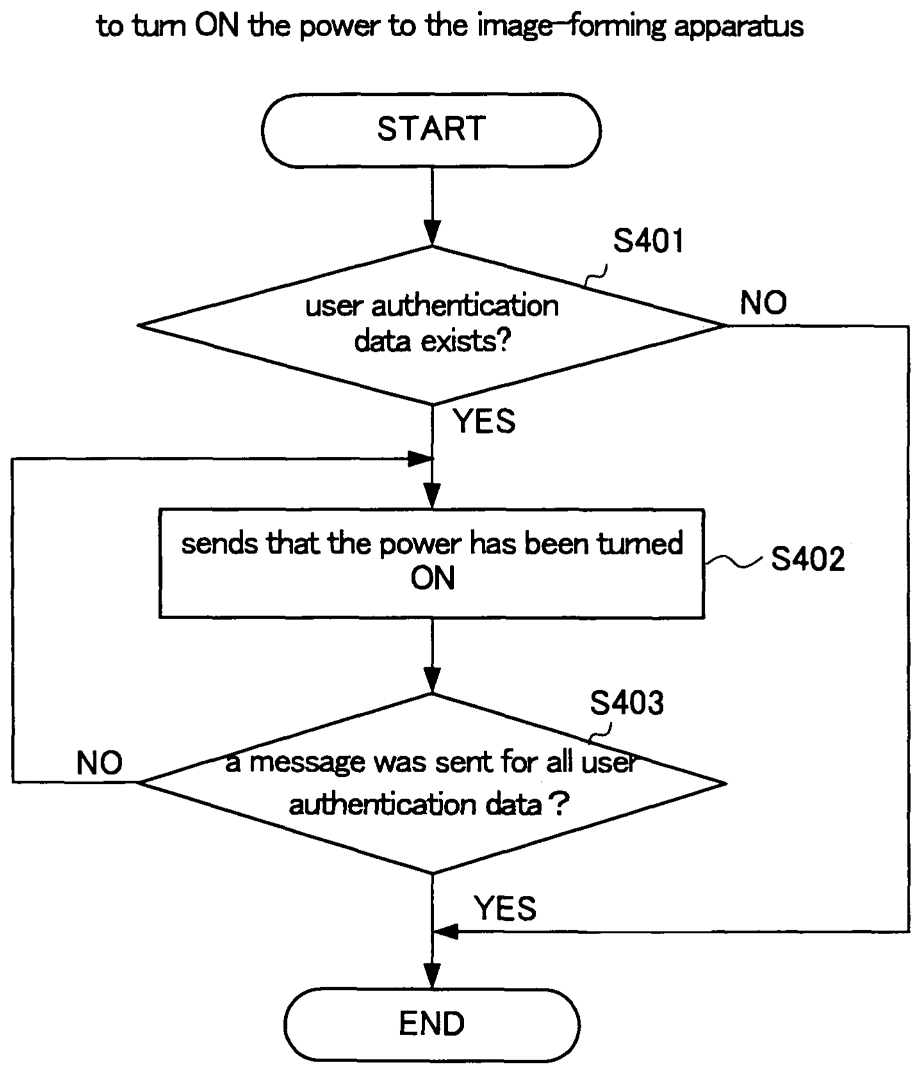
FIG. 9 is a diagram showing a power ON flowchart of the Image-forming apparatus of the present invention.

The following explains the operations to turn ON the power to the Image-forming apparatus 1 with reference to the flowchart shown in FIG. 9. This program starts when the power is turned ON.

In step S401, the Image-forming apparatus 1 CPU determines whether user authentication data exists in the user authentication data memory unit 11. If the user authentication data does not exist, the processing ends. If the user authentication data exists, the processing shifts to step S402.

When the processing shifts to step S402, the Image-forming apparatus 1 CPU sends to the user terminal 60 where the user authentication data stored in the user authentication data memory unit 11 exists a message notifying that the power to the Image-forming apparatus 1 has been turned ON. Then, the processing shifts to step S403.

When the processing shifts to step S403, the Image-forming apparatus 1 CPU determines whether a message was sent notifying that power was turned ON for all user authentication data stored in the user authentication data memory unit 11. If a message was sent notifying that the power was turned ON for all user authentication data stored in the user authentication data memory unit 11, the processing ends. If a user terminal 60 exists that was not sent the message notifying that the power was turned ON, the processing shifts to step S402.

Figure 10:
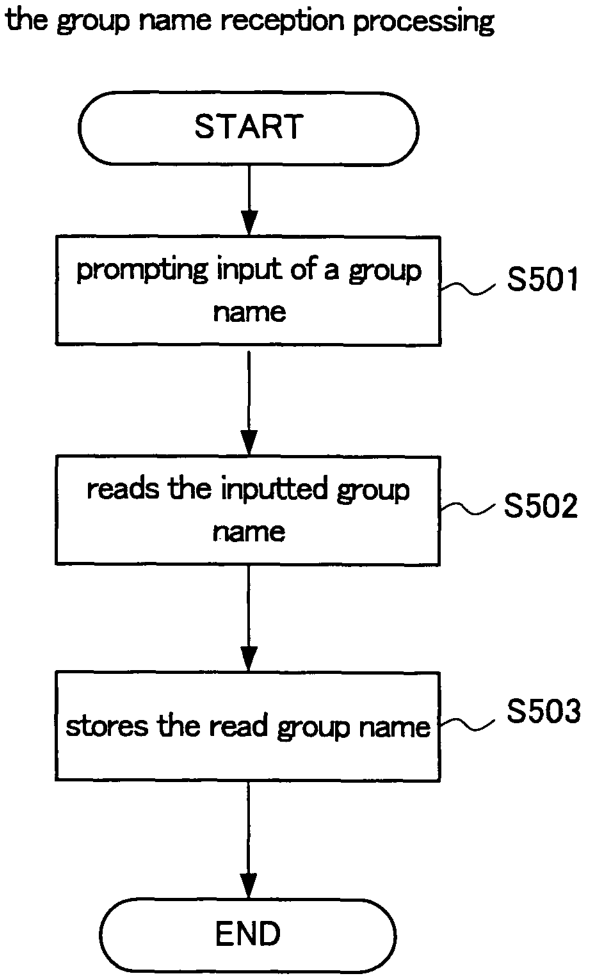
FIG. 10 is a diagram showing a group name reception process flowchart of the present invention.

The following explains the operations of the group name reception processing on the Image-forming apparatus 1 with reference to the flowchart shown in FIG. 10. This program is started by a group name input request.

In step S501, the Image-forming apparatus 1 CPU displays a screen prompting input of a group name as group name reception processing. Then, the processing shifts to step S502.

When the processing shifts to step S502, the Image-forming apparatus 1 CPU reads the inputted group name. Then, the processing shifts to step S503.

When the processing shifts to step S503, the Image-forming apparatus 1 CPU stores the read group name as data. Then, the processing ends.

Figure 11:
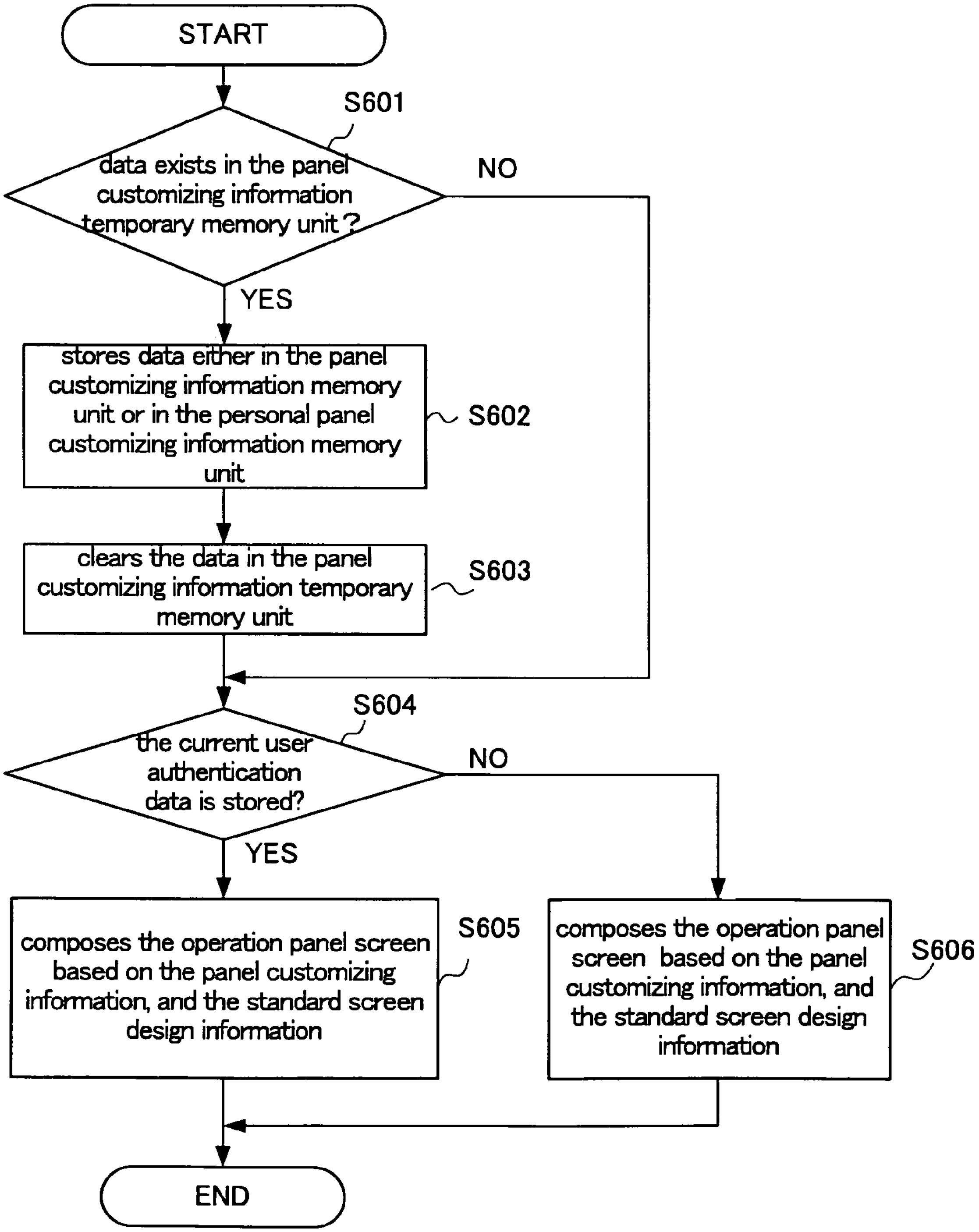
FIG. 11 is a diagram showing an operation panel operation starting process flowchart of the present invention.

The following explains the operations of the operation panel operation starting processing on the Image-forming apparatus 1 with reference to the flowchart shown in FIG. 11. This program is started when operations of the operation panel 8 are started.

In step S601, the Image-forming apparatus 1 CPU determines whether data exists in the panel customizing information temporary memory unit. If data does not exist, the processing shifts to step S604. If data exists, the processing shifts to step S602.

When the processing shifts to step S602, the Image-forming apparatus 1 CPU stores data of the panel customizing information temporary memory unit either in the panel customizing information memory unit 5 or in the personal panel customizing information memory unit 10. Then, the processing shifts to step S603.

When the processing shifts to step S603, the Image-forming apparatus 1 CPU clears the data in the panel customizing information temporary memory unit. Then, the processing shifts to step S604.

When the processing shifts to step S604, the Image-forming apparatus 1 CPU determines whether the current user authentication data is stored. If the current user authentication data is not stored, the processing shifts to step S606. If the current user authentication data is stored, the processing shifts to step S605.

When the processing shifts to step S605, the Image-forming apparatus 1 CPU composes the operation panel screen 9 based on the panel customizing information 100 stored in the personal panel customizing information memory unit 10 that corresponds to the current user authentication data, and the standard screen design information. Then, the processing ends.

When the processing shifts to step S606, the Image-forming apparatus 1 CPU composes the operation panel screen 9 based on the panel customizing information 100 stored in the panel customizing information memory unit 5, and the standard screen design information. Then, the processing ends.

According to this embodiment, the Image-forming apparatus 1 can be customized by being connected to the following type of network configuration. The following explains in further detail based on the drawings provided.

Figure 12:
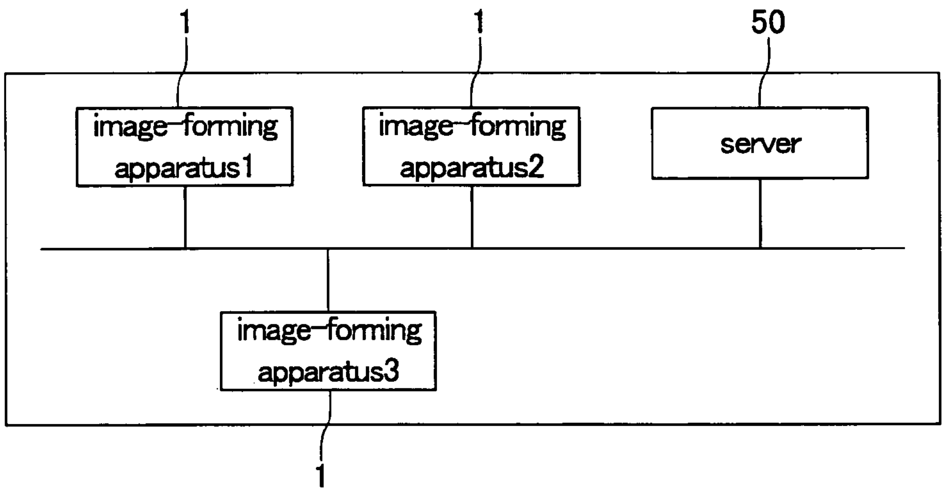
FIG. 12 is a diagram showing a network configuration (1) of the present invention.

FIG. 12 shows a case in which a network is configured with a plurality of Image-forming apparatuses 1 and a server 50. With this configuration, the server 50 holds the panel customizing information 100 of the Image-forming apparatus 1. Moreover, with the server 50, when the settings are updated for the panel customizing information 100, the panel customizing information 100 is sent from the server 50 along with a settings update message. Therefore, if received by the Image-forming apparatus 1, the panel customizing information 100 of the server 50 is stored in the panel customizing information memory unit 5 of the Image-forming apparatus 1 (see step S154 in FIG. 5), and the configurations of the operation panel screen 9 and keys are controlled based on the panel customizing information 100 and standard screen design information, at the operation panel screen control processing (see step S105 in FIG. 3). Therefore, simply by updating settings with the server 50, the settings of the panel customizing information 100 of the plurality of Image-forming apparatuses 1 connected to the network are updated.

This can also be implemented by grouping. For example, in the Image-forming apparatus 1, the group name is input and stored using the group name reception processing (see FIG.

10). When this is performed, if the received panel customizing information 100 differs from the stored group name, the panel customizing information 100 is not stored (see step S112 in FIG. 4), so it is possible to make customizing settings for the Image-forming apparatus of the same group (e.g., that particular section).

Furthermore, if a user is operating the Image-forming apparatus 1 at the time that the panel customizing information 100 is received, that information is temporarily stored (see step S211 in FIG. 7), and when the user begins to use the operation panel 8, the temporary memory is referenced (see step S601 in FIG. 11), so even if the Image-forming apparatus 1 is being used, it is possible to receive the panel customizing information 100.

Figure 13:
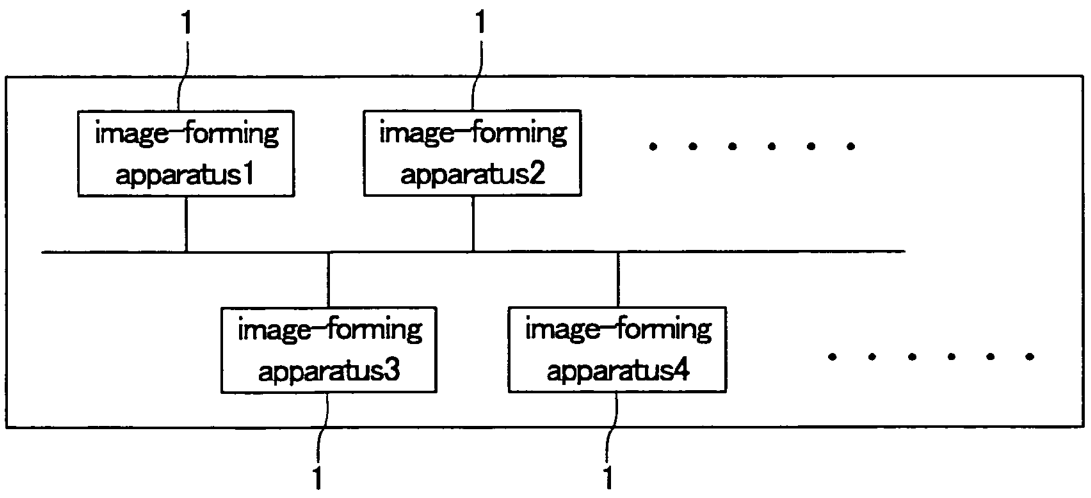
FIG. 13 is a diagram showing a network configuration (2) of the present invention.

FIG. 13 shows a case in which a network is only configured with a plurality of Image-forming apparatuses 1. With this configuration, each of the Image-forming apparatuses 1 holds the panel customizing information 100.

Moreover, when the settings of the panel customizing information 100 are updated at one Image-forming apparatus 1, the Image-forming apparatus 1 that started the settings update sends a settings update starting message, and when the update of the settings is completed, it sends a settings update ending message (see step S304 in FIG. 8). On the other hand, after another Image-forming apparatus 1 receives the settings update starting message, it displays a message indicating that settings cannot be updated until the settings update ending message is received (see step S305 in FIG. 8). By establishing this type of protocol, it is possible to prevent competition for settings update on a network configured only of Image-forming apparatuses. After the settings update ending message is received, it is possible to update the settings of that Image-forming apparatus 1 by receiving the panel customizing information 100 having settings that have been updated.

Figure 14:
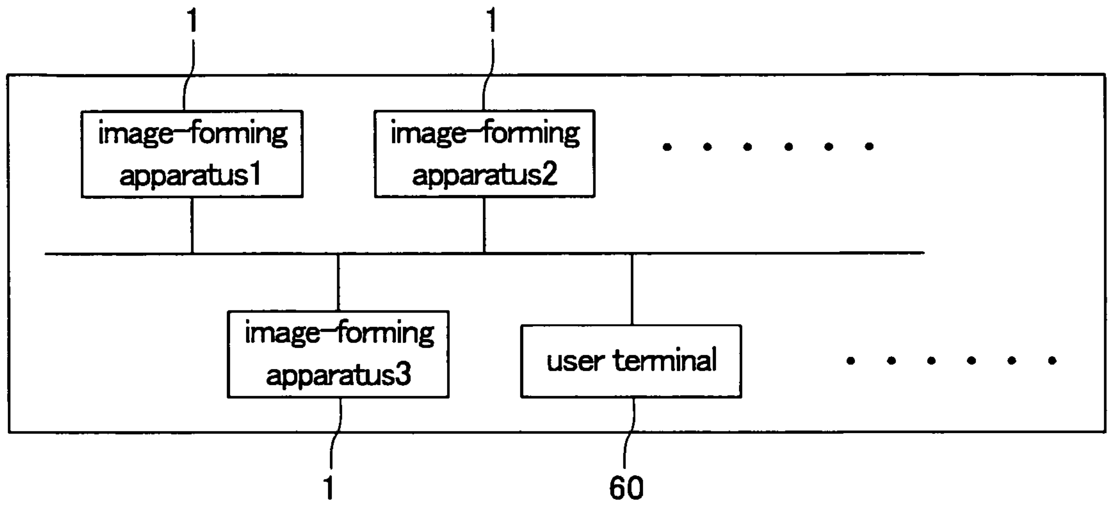
FIG. 14 is a diagram showing a network configuration (3) of the present invention.

FIG. 14 shows a case in which a network is configured with a plurality of Image-forming apparatuses 1 and a user terminal 60. With this configuration, the user terminal 60 holds the panel customizing information 100. In normal operations, this is the same as the network configuration with the server 50. When operating using user authentication data, personal customizing is possible (see the second embodiment). A case where the panel customizing information 100 is received while the user is operating the Image-forming apparatus 1 is the same as the configuration of the server 50.

Figure 15:
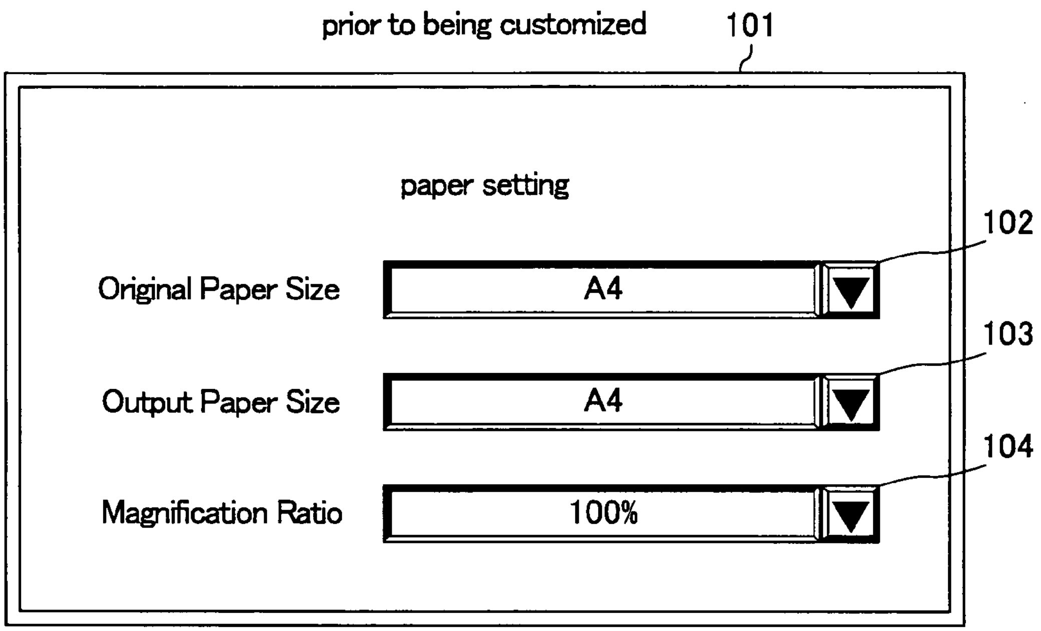
FIG. 15 is a diagram showing a paper selection screen prior to customizing the operation panel of the present invention.

FIG. 15 shows the setting contents of the operation panel screen 9 prior to being customized, in other words, the standard-operation panel screen 9 for the paper setting screen 101 on a copier. For example, Original Paper Size 102 is A4, Output Paper Size 103 is A4, and Magnification Ratio 104 is 100 percent are displayed as default settings.

Figure 16:
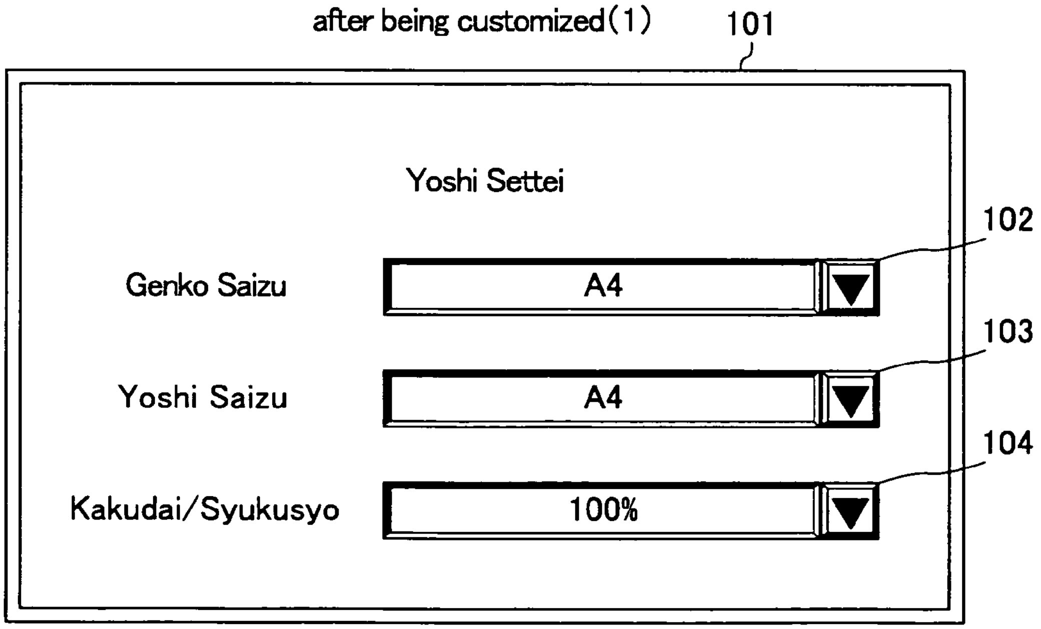
FIG. 16 is a diagram showing a paper selection screen after customizing the operation panel (1) of the present invention.

FIG. 16 shows the setting contents of the operation panel screen 9 after being customized (1) for the paper setting screen 101 on the copier. For example, if the display language is switched from English to Japanese, the display for the paper setting of the operation panel screen 9 is A4 as the Original Paper Size(Genko Saizu)102; A4 for the Output Paper Size(Yoshi Saizu)103; and 100 percent for the Magnification Ratio(Kakudai/Shukusyo)104.

Figure 17:
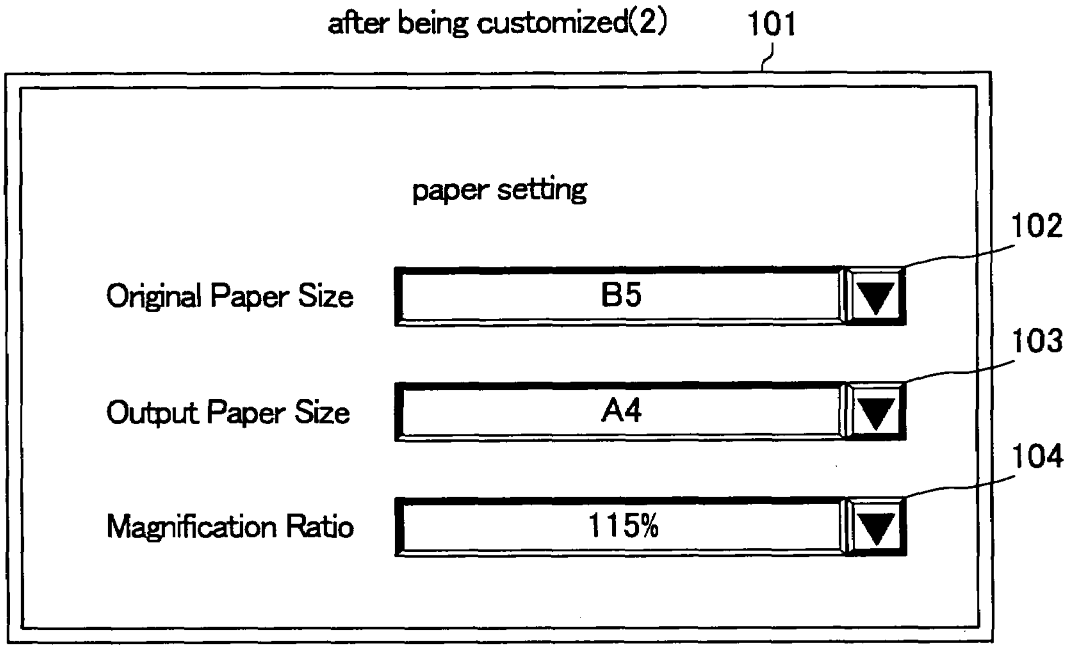
FIG. 17 is a diagram showing a paper selection screen after customizing the operation panel (2) of the present invention.

FIG. 17 shows the setting contents of the operation panel screen 9 after being customized (2) for the paper setting screen 101 on the copier. For example, the drawing shows the initial setting of the Original Paper Size 102 as B5, the initial setting of the Paper Size 103 as A4, and the initial setting of the Magnification Ratio 104 as 115 percent. Thus, as described above, the Image-forming apparatus 1 can receive the panel customizing information 100 from a server, user terminal or other Image-forming apparatuses 1 connected to a network, and can control the configurations of the operation panel screen 9 and operating keys based on the received panel customizing information 100 and standard screen design information. Therefore, if one of the server, user terminal and another Image-forming apparatus 1 updates the settings of the panel customizing information 100, it is possible to update the configurations of the operation panel screens 9 and keys at all other Image-forming apparatuses 1 by receiving that information.

In addition, if it is detected that the operator is using the operation panel 8, based on signals of the operation panel 8, the panel customizing information 100 received from the server, user terminal or another Image-forming apparatus is temporarily stored, and when operation of the operation panel 8 is begun, the operation panel screen control unit 7 stores the temporarily stored panel customizing information 100 in the panel customizing information memory unit 5. On the other hand, the operation panel screen control unit 7 controls the configurations of the operation panel screen 9 and operating keys based on the panel customizing information 100 stored in the panel customizing information memory unit 5, and the design information of the standard screen, so the Image-forming apparatus 1 is able to receive the panel customizing information 100 even when the operation panel 8 is being operated.

The Image-forming apparatus 1 can store the panel customizing information 100 for the same group name, according to a determination by the sending origin determining unit 3. Therefore, of a plurality of panel customizing information 100 that exists on a server or the like, only the panel customizing information 100 of the group name that is the same as the stored group name is stored in the panel customizing information memory unit 5, so the panel settings are not mistakenly changed using the panel customizing information 100 of another group. In addition, the plurality of panel customizing information 100 can be safely saved on the server or the like, and the settings can be changed within the group when required.

Furthermore, when the server has the panel customizing information 100, the panel customizing information 100 is sent along with the notification message that the settings of the panel customizing information 100 were updated. Therefore, the main Image-forming apparatus 1 receives the panel customizing information 100 safely and securely from the server and it can be stored.

Moreover, the other Image-forming apparatuses 1 send a settings update starting message when the update of the settings of the panel customizing information 100 is started, and a settings update ending message when the update of the settings is ended. The update of the settings of the Image-forming apparatus 1 is prohibited and the prohibited settings update is cancelled according to the starting message and the ending message. Therefore, the main Image-forming apparatus 1 can safely update the settings of the panel customizing information 100 even if the network is configured of a plurality of Image-forming apparatuses 1.

Second Embodiment

Another embodiment of the Image-forming apparatus 1 of the present invention will now be explained with reference to FIGS. 18 to 22. It is possible for this Image-forming apparatus 1 (FIG. 18) to customize the operation panel screen 9. As a configuration of this embodiment, the personal panel customizing information memory unit 10, the user authentication data memory unit 11, a current user authentication data memory unit 12, a current user authentication data switching unit 13, a power start message memory unit (RAM) that stores the power start message notifying that power to the Image-forming apparatus 1 has been turned on, and a user terminal address memory unit (RAM) that stores user terminal addresses are provided in addition to the first embodiment. The following explains these in detail based on the drawings provided.

Figure 18:
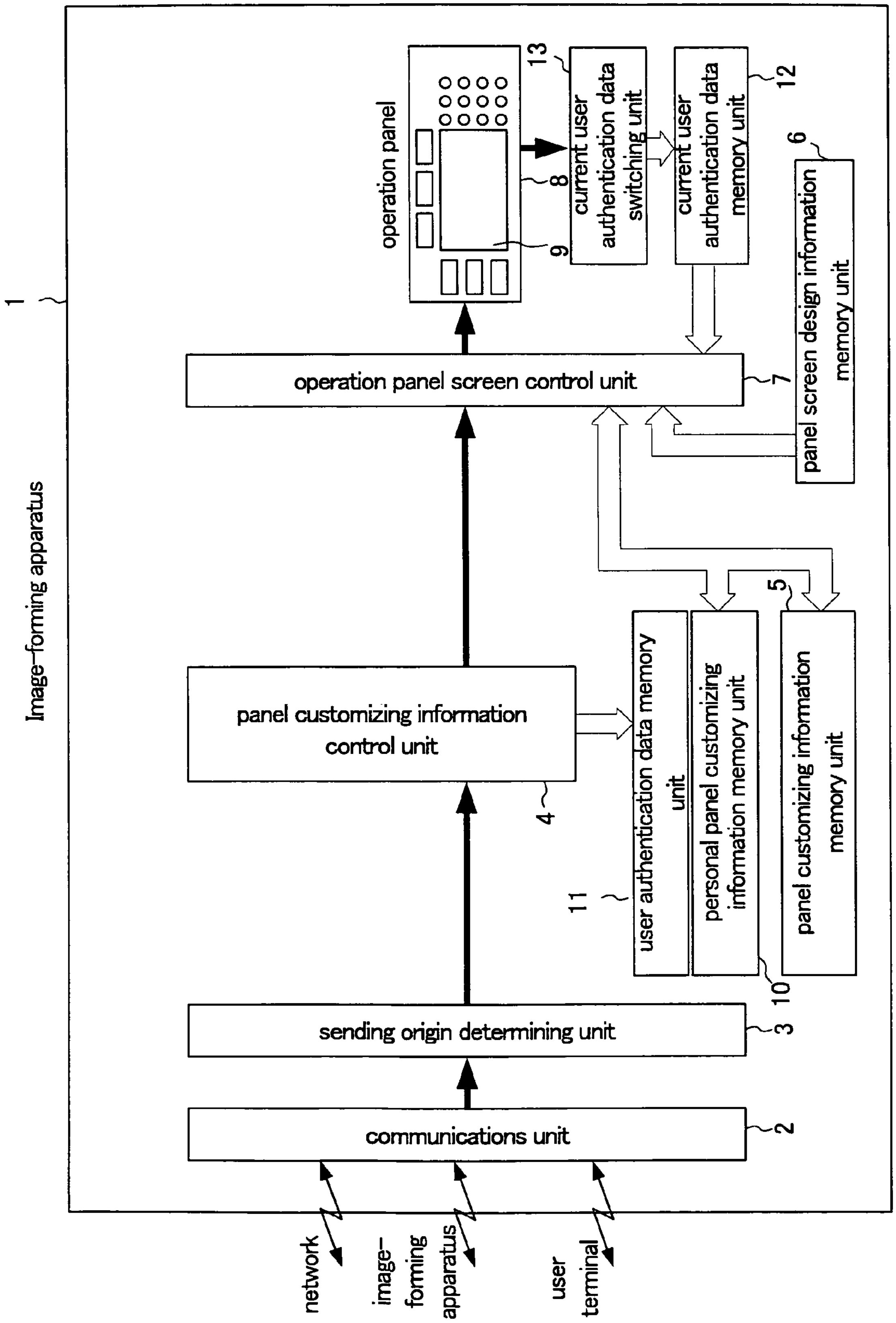
FIG. 18 is a diagram showing a configuration block of an Image-forming apparatus of a second embodiment of the present invention.

FIG. 18 is a block diagram showing a configuration block of the Image-forming apparatus 1 according to the present invention. Symbols 1 to 9 are the same as those described in relation to the first embodiment.

The personal panel customizing information memory unit 10 stores the panel customizing information 100 in RAM or the like (hereinafter, the panel customizing information 100 is called the personal panel customizing information). The personal panel customizing information memory unit 10 forms a pair with the user authentication data memory unit 11. Therefore, it is possible to make personal settings for the panel customizing information of the Image-forming apparatus. For example, in the copy function, it is possible to magnify the display of paper setting function icons for personal use (see FIG. 22).

The user authentication data memory unit 11 stores the user authentication data 100 in RAM or the like. The user authentication data is information used for authenticating a user terminal 60. Therefore, the current user authentication data memory unit 12 stores the user authentication data specified from the user authentication data stored in the user authentication data memory unit 11. The current user authentication data switching unit 13 switches user authentication data of the current user authentication data memory unit according to user input.

Figure 19:
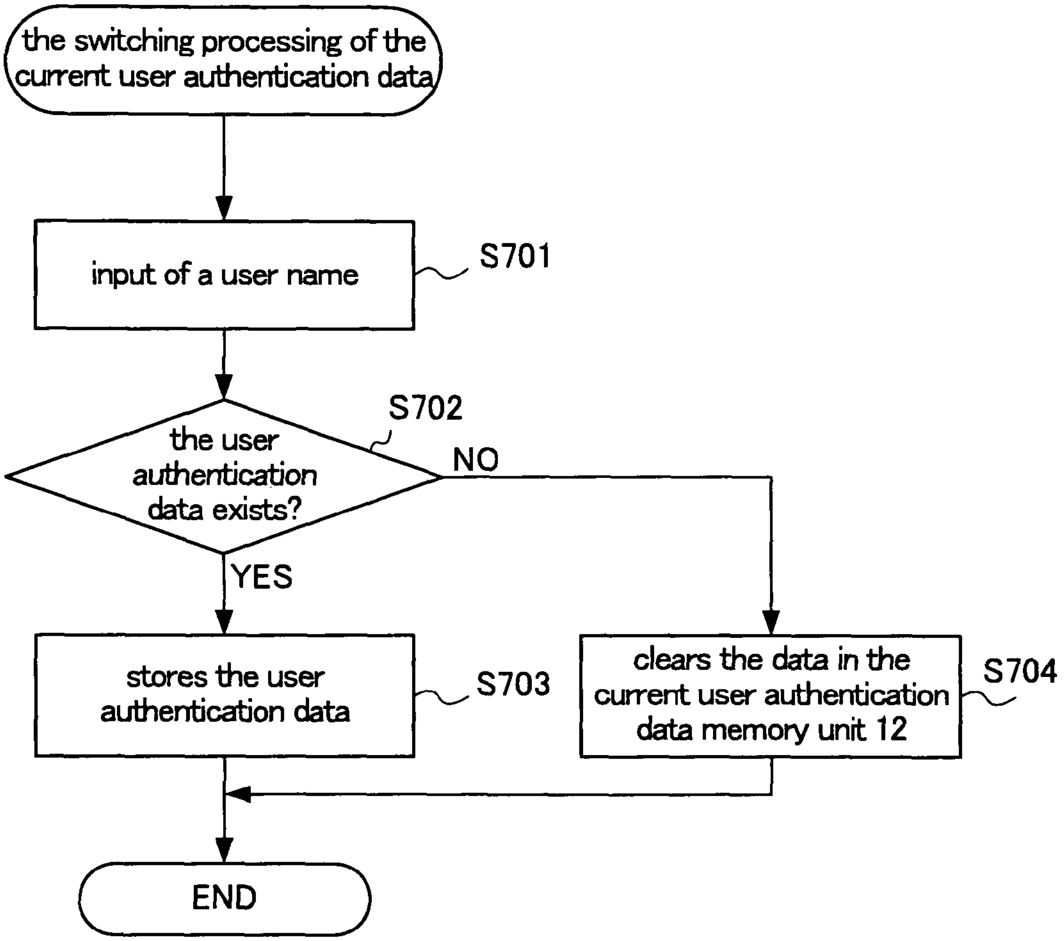
FIG. 19 is a diagram showing a switching processing flowchart of current user authentication data of the present invention.

The following explains the operations of the switching processing of the current user authentication data with reference to the flowchart shown in FIG. 19. This program is started by the operation panel screen control unit 7 according to a request when switching the panel customizing information 100 and personal panel customizing information or when switching a plurality of personal panel customizing information.

In step S701, the Image-forming apparatus 1 CPU displays a screen prompting input of a user name. Then, the processing shifts to step S702.

When the processing shifts to step S702, the Image-forming apparatus 1 CPU determines whether the user authentication data that corresponds to the inputted user name exists. If the user authentication data exists, the processing shifts to step S703. If the user authentication data does not exist, the processing shifts to step S704.

When the processing shifts to step S703, the Image-forming apparatus 1 CPU stores the user authentication data that corresponds to the inputted user name in the current user authentication data memory unit 12. Then, the processing ends.

When the processing shifts to step S704, the Image-forming apparatus 1 CPU clears the content of the current user authentication data memory unit 12. Then, the processing ends.

Figure 20:
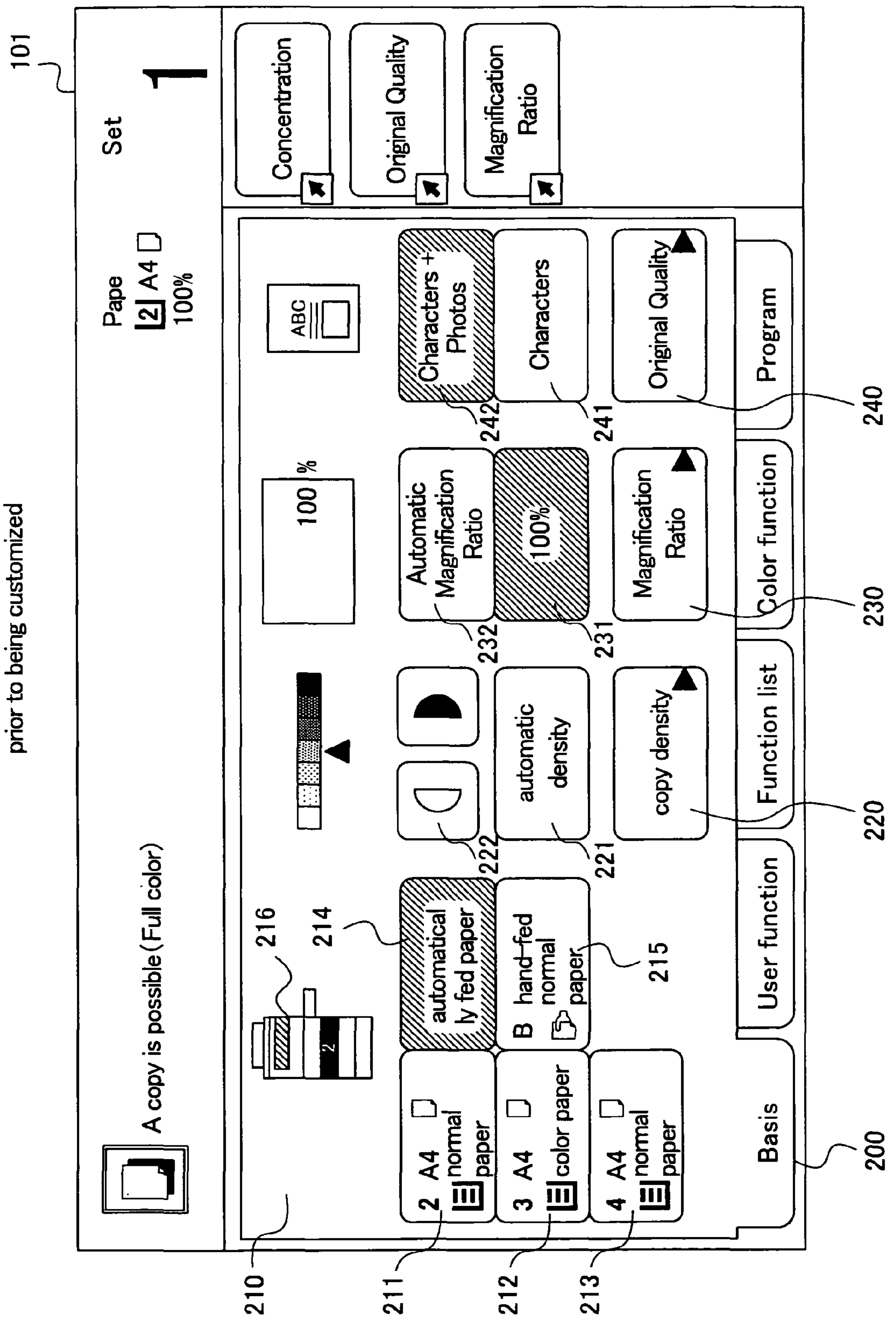
FIG. 20 is a diagram showing before customizing of the operation panel of the present invention.

FIG. 20 shows the setting contents of the operation panel screen 9 prior to being customized, in other words, the standard operation panel screen 9 for a screen 210 that displays the basic functions 200 of a copying feature. For example, as basic functions of the copying feature on a standard screen prior to customizing, paper selections are A4 normal paper 211, A4 color paper 212, A4 normal paper 213, automatically fed paper 214, hand-fed normal paper 215, and a copier icon 216. Copy density selections include copy density 220, automatic density 221, and density specification 222; magnification rate selections include Magnification Ratio 230, 100 percent 231, and Automatic Magnification Ratio 232; and as original image quality selections, Original Quality 240, Characters 241, and Characters+Photos 242.

Figure 21:
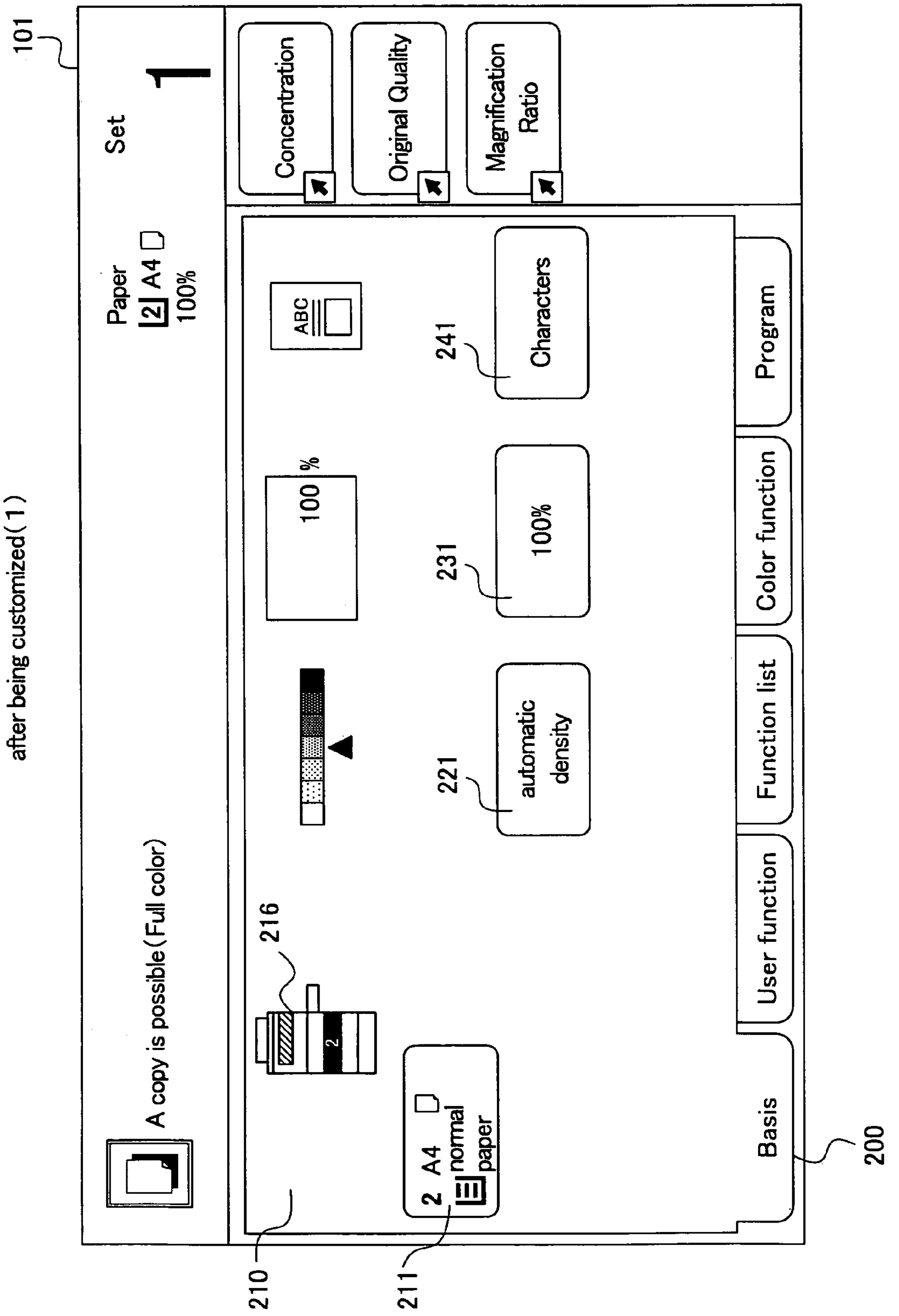
FIG. 21 is a diagram showing a paper selection screen after customizing the operation panel (1) of the present invention.

FIG. 21 shows the setting contents of the operation panel screen 9 after being customized (1) for the basic functions 200 of the copier feature. For example, this shows that as a result of the selections, the basic functions of the copy feature are customized to display A4 Normal Paper as the paper selection, Automatic Density 221 for the copy density, 100 percent 231 for the Magnification Ratio selection, and Characters 241 for the Original Image Quality selection. This also shows that the positions to display each of the selected functions can be customized.

Figure 22:
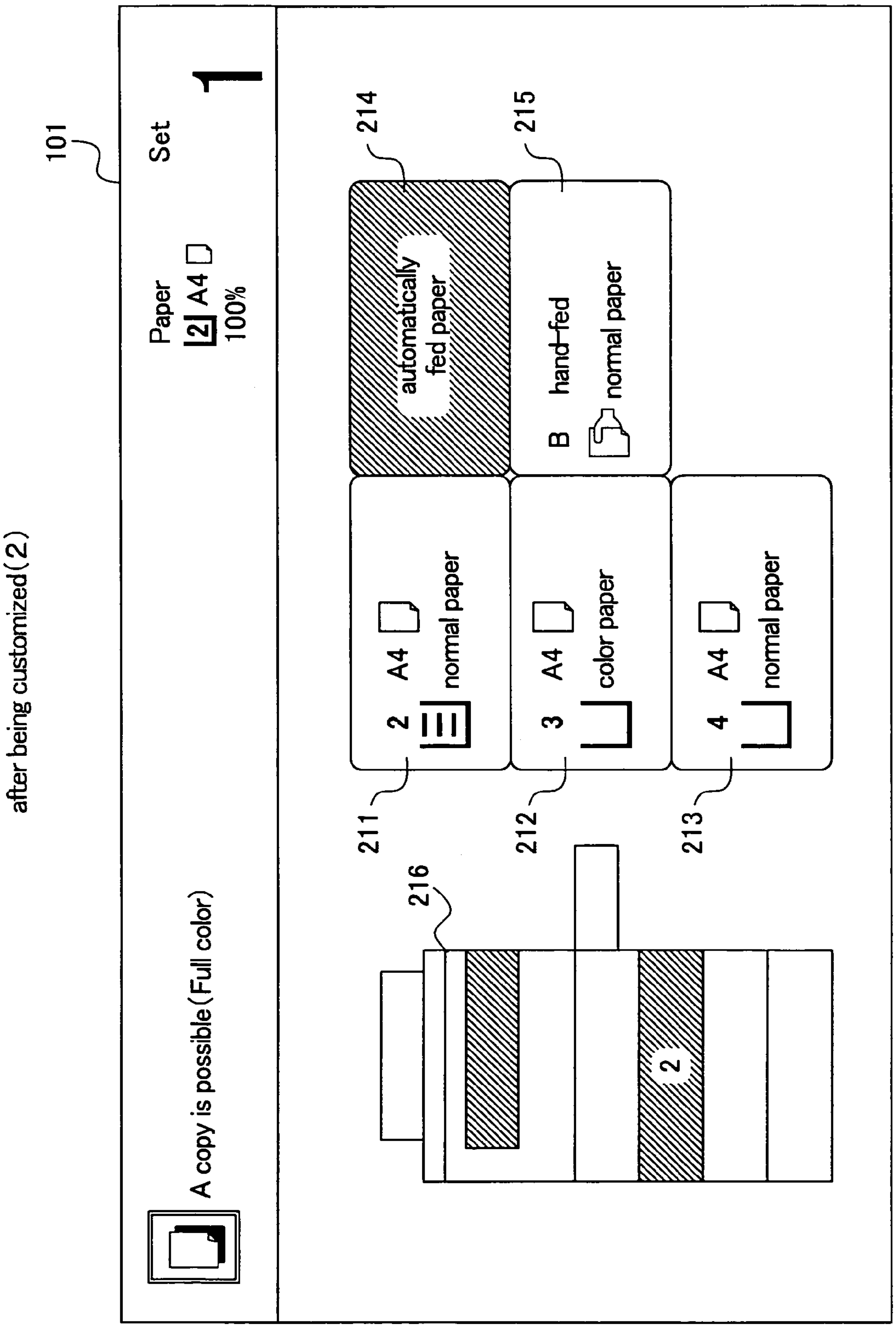
FIG. 22 is a diagram showing a paper selection screen after customizing the-operation panel (2) of the present invention.

FIG. 22 shows the setting contents of the operation panel screen 9 after being customized (2) for the basic functions 200 of the copier feature. For example, this shows that the basic functions of the copy feature were customized as a result of the selections so that only paper selections are displayed. Each selection display is enlarged, showing A4 Normal Paper 211, A4 Color Paper 212, A4 Normal Paper 213, Automatically Fed Paper 214, Hand-Fed Paper 215, and the Copier icon 216.

The following explains operations using the user authentication data, in a network configured with a plurality of Image-forming apparatuses 1 and a user terminal 60, shown in FIG. 14.

When operating using user authentication data, user authentication data is stored in the Image-forming apparatus 1. It is possible to use the switching process of the user authentication data (FIG. 19) of the Image-forming apparatus 1. For example, an Image-forming apparatus 1 with an apparatus name Z stores the user authentication data of the user terminal 60 of user name A. In that case, panel customizing information 100 that Z received from the user terminal 60 composed of A is stored in the personal panel customizing information memory unit 10 pairing the user A and the panel customizing information 100 as the panel customizing information 100 of the user A at Z. Moreover, with the switching processing of the user authentication data, when user name A is input, the user A is stored as the current user authentication data, so the configurations of the operation panel screen 9 and keys on Z are the customized settings of user A (e.g., the enlarged settings of FIG. 22). In other words, it is possible to use that as the Image-forming apparatus 1 that was set customized for user A. Even if the panel customizing information 100 is received from the server 50, it is only stored in the panel customizing information memory unit 5, so the screen configuration will not change. To return the settings to normal, when the user name is cleared (for example, by inputting 0) in the switching processing of the user authentication data (see step S703 in FIG. 19), the current user authentication data is cleared, so the screen returns to the screen configuration set by the panel customizing information 100 (see step S606 of FIG. 11).

When operating using user authentication data, the address information of the user terminal is received from the user terminal when the power to the Image-forming apparatus 1 is turned on (see step S123 of FIG. 4, and FIG. 9), so even if the configuration of the user terminals is changed, it is possible to manage it when the Image-forming apparatus 1 is started up. Thus, as described above, the panel customizing information control unit 4 of the Image-forming apparatus 1 stores the panel customizing information 100 in the personal panel customizing information memory unit 10 based on the user authentication data of the panel customizing information 100 received via the communications unit 2. On the other hand, the current user authentication data switching unit 13 stores one of the user authentication data according to instructions in the current user authentication data memory unit 12. The operation panel screen control unit 7 controls the configurations of the operation panel screen 9 and operating keys based on the panel customizing information 100 stored by the personal panel customizing information memory unit 10, and the design information of the standard screen forming a pair with the user authentication data stored by the current user authentication data memory unit 12. Therefore, if personalized panel customizing information 100 is sent to the Image-forming apparatus 1, it is possible to set that for the operation panel screen based on that personalized panel customizing information 100 by specifying the user authentication data when using the Image-forming apparatus 1.

Furthermore, the Image-forming apparatus 1 sends the power starting message to the user terminal of the group to which that Image-forming apparatus 1 belongs, receives the address information of the user terminal and the user authentication data in response to sending the power starting message and, if the user authentication data is the same as the user authentication data stored by the user terminal authentication data memory unit, stores the address information of the user terminal in the user terminal address memory unit and receives the panel customizing information 100 via the communications unit 2 based on the address information of the user terminal stored by the user terminal address memory unit. In other words, the Image-forming apparatus 1 sends the power starting message when the power is turned on and receives the user terminal address information and data from the user terminal in response to sending. When the user authentication data exists on the Image-forming apparatus, the address information of the user terminal and the user authentication data are stored and the panel customizing information 100 is received based on the stored address information of the user terminal. Therefore, even if the address of the user terminal is changed, if the power is turned on again, it is possible to receive the panel customizing information from the user terminal.

With this embodiment, it is possible to input only a group name, but it is also acceptable to input a model name. Even if the model is different, if the customizing settings correspond, it is possible to store them as panel customizing information.

With this embodiment, if the model name is different, the panel customizing information is not stored, but by storing a table corresponding to the type and the model, it is possible to store it even if the type and model are different. For example, if the magnification ratio is set to its maximum, a maximum magnification ratio will be set for each type. In other words, if the maximum magnification ratio for A type model A is 200 percent and 400 percent for A type model B, it is customized at that maximum magnification ratio. In addition, it is possible to store that even if the type and model names are different by assignment using a correspondence table when the 200 percent for A type is equivalent to 250 percent of the B type.

Furthermore, it is possible to apply this invention to other network connected devices equipped with an operation panel other than the type of Image-forming apparatus 1 of the present embodiment.

The embodiments have been explained above, but that is not to be construed as a limitation to the present invention; it is possible to implement a variety of design changes and revisions within the scope of the appended patent claims.

What is claimed is:

1. An Image-forming apparatus comprising:

a communications unit for communicating data with a server, user terminal, and a plurality of other Image-forming apparatuses connected to a network;

a panel screen design information memory unit for storing standard screen design information of an operation panel screen;

a panel customizing information memory unit for storing panel customizing information including sending origin identification information, user information including a type and model of the Image-forming apparatus, and panel customizing data;

a settings update message memory unit for storing a settings update starting message indicating a start of updating panel customizing information settings, or a settings update ending message indicating an end of updating panel customizing information settings;

a sending origin determining unit for determining a type of a sending origin according to sending origin identification information of the panel customizing information received via the communications unit;

a panel customizing information control unit for receiving the settings update starting message from one Image-forming apparatus among the plurality of other Image-forming apparatuses via the communications unit, prohibiting the update of settings, receiving the panel customizing information via the communications unit, controlling according to the type of sending origin determined by the sending origin determining unit, converting the panel customizing information received via the communications unit based on a correspondence table in which panel customizing data of each type and model of the Image-forming apparatus is associated with each other, storing the panel customizing information in the panel customizing information memory unit, receiving the settings update ending message via the communications unit, and cancelling the prohibition of the update of the settings; and an operation panel screen control unit for controlling configurations of the operation panel screens and operating keys based on the panel customizing information stored by the panel customizing information memory unit, and standard screen design information.

2. The Image-forming apparatus according to claim 1, further comprising, a panel customizing information temporary memory unit for temporarily storing the panel customizing information received via the communications unit, wherein the panel customizing information control unit stores the panel customizing information, received via the communications unit, in the panel customizing information temporary memory unit instead of in the panel customizing information memory unit, and when it is determined that the operation panel is not being operated based on operation panel signals and when the panel customizing information is stored in the panel customizing information temporary memory unit, the operation panel screen control unit stores the panel customizing information stored by the panel customizing information temporary memory unit in the panel customizing information memory unit, and erases the panel customizing information stored in the panel customizing information temporary memory unit.

3. The Image-forming apparatus according to claim 2, further comprising:

a group name data reception unit for receiving input of group name data; and a group name data memory unit for storing the inputted group name data, wherein the user information includes a group name and model description of the Image-forming apparatus, the sending origin determination unit determines whether the data of the group name of the panel customizing information received via the communications unit and the group name data stored by the group name data memory unit to determine are the same, and when the sending origin determination unit determines that the data are the same, the panel customizing information control unit stores the panel customizing information in the panel customizing information temporary memory unit.

4. The Image-forming apparatus according to claim 3, wherein the server includes the panel customizing information, and the panel customizing information control unit stores the panel customizing information in the panel customizing information memory unit based on a settings update notification message of an update of settings of the panel customizing information, received from the server via the communications unit.

5. The Image-forming apparatus according to claim 3, further comprising:

a user authentication data memory unit for storing user authentication data that authenticates a user terminal;

a personal panel customizing information memory unit for storing the panel customizing information that forms a pair with the user authentication data separately from the panel customizing information memory unit;

a current user authentication data memory unit for storing one of the user authentication data of a plurality of the user authentication data; and a current user authentication data switching unit for switching the user authentication data stored in the current user authentication data memory unit according to instruction; wherein the user information further includes user authentication data, the user terminal includes the panel customizing information, the panel customizing information control unit stores the personal panel customizing information in the personal panel customizing information memory unit based on the user authentication data of the personal panel customizing information received via the communications unit, the current user authentication data switching unit stores one of the user authentication data in the current user authentication data memory unit according to an instruction, and the operation panel screen control unit controls configurations of the operation panel screen and operating keys based on the panel customizing information stored by the personal panel customizing information memory unit, and the standard screen design information forming a pair with the user authentication data stored by the current user authentication data memory unit.

6. The Image-forming apparatus according to claim 5, further comprising:

a power starting message memory unit for storing a power starting message that notifies that the power of the Image-forming apparatus has been turned on; and a user terminal address memory unit for storing an address of the user terminal; wherein the Image-forming apparatus sends to a user terminal of a group to which the Image-forming apparatus belongs the power starting message, receives the address of the user terminal and user authentication data by sending the power starting message, if the user authentication data is the same as the user authentication data stored by the user authentication data memory unit, stores the address information of the user terminal in the user terminal address memory unit, and receives via the communications unit the panel customizing information based on the address information of the user terminal stored by the user terminal address memory unit.

7. A recording medium readable by a computer that stores an Image-forming apparatus program for executing customizing of operation panel screens on an Image-forming apparatus, comprising the steps of:

communicating, by a communications unit, data with a server, user terminal and a plurality of other Image-forming apparatuses connected to a network;

storing, by a panel screen design information memory unit, standard screen design information of an operation panel screen;

storing, by a panel customizing information memory unit, panel customizing information including sending origin identification information, user information including a type and a model of the Image-forming apparatus, and panel customizing data;

storing, by a settings update message memory unit, a settings update starting message indicating the start of updating panel customizing information settings, or a settings update ending message indicating the end of updating panel customizing information settings;

determining, by the Image-forming apparatus, a type of sending origin according to the sending origin identification information of the panel customizing information received via the communications unit;

receiving, by the Image-forming apparatus, the settings update starting message from one Image-forming apparatus among a plurality of other Image-forming apparatuses via the communications unit;

prohibiting, by the Image-forming apparatus, the update of settings;

receiving, by the Image-forming apparatus, the panel customizing information via the communications unit;

controlling, by the Image-forming apparatus, according to the type of sending origin determined in the step of determining the type of sending origin;

converting, by the Image-forming apparatus, the panel customizing information received via the communications unit, based on a correspondence table in which panel customizing data of each type and model of the Image-forming apparatus is associated with each other;

storing, by the Image-forming apparatus, the panel customizing information in the panel customizing information memory unit;

receiving, by the Image-forming apparatus, the settings update ending message via the communications unit;

cancelling, by the Image-forming apparatus, the prohibition of the update of the settings; and controlling, by the Image-forming apparatus, configurations of the operation panel screen and operating keys based on the panel customizing information stored by the panel customizing information memory unit, and the standard screen design information.

8. A method for customizing an operation panel screen by an Image-forming apparatus, comprising the steps of:

communicating, by a communications unit, data with a server, user terminal and a plurality of other Image-forming apparatuses connected to a network;

storing, by a panel screen design information memory unit, standard screen design information of the operation panel screen;

storing, by a panel customizing information memory unit, panel customizing information including sending origin identification information, user information including a type and a model of the Image-forming apparatus, and panel customizing data;

storing, by a settings update message memory unit, a settings update starting message indicating the start of updating panel customizing information settings, or a settings update ending message indicating the end of updating panel customizing information settings;

determining, by the Image-forming apparatus, a type of sending origin according to the sending origin identification information of the panel customizing information received via the communications unit;

receiving, by the Image-forming apparatus, the settings update starting message from one Image-forming apparatus among the plurality of other Image-forming apparatuses via the communications unit;

prohibiting, by the Image-forming apparatus, the update of settings;

receiving, by the Image-forming apparatus, the panel customizing information via the communications unit;

controlling, by the Image-forming apparatus, according to the type of sending origin determined in the step of determining a type of sending origin;

converting, by the Image-forming apparatus, the panel customizing information received via the communications unit, based on a correspondence table in which panel customization data of each type and model of the Image-forming apparatus is associated with each other;

storing, by the Image-forming apparatus, the panel customizing information in the panel customizing information memory unit;

receiving, by the Image-forming apparatus, the settings update ending message via the communications unit;

cancelling, by the Image-forming apparatus, the prohibition of the update of the settings; and controlling, by the Image-forming apparatus, configurations of the operation panel screens and operating keys based on the panel customizing information stored by the panel customizing information memory unit, and the standard screen design information.

* * * * *